US012362520B2

(12) United States Patent
Aoki et al.

(10) Patent No.: US 12,362,520 B2
(45) Date of Patent: Jul. 15, 2025

(54) FLOATING CONNECTOR

(71) Applicant: JAPAN AVIATION ELECTRONICS INDUSTRY, LIMITED, Tokyo (JP)

(72) Inventors: Shigeharu Aoki, Tokyo (JP); Kenichi Shimoji, Tokyo (JP); Kiichi Hori, Tokyo (JP); Masamichi Sasaki, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 382 days.

(21) Appl. No.: 18/102,837

(22) Filed: Jan. 30, 2023

(65) Prior Publication Data

US 2023/0307872 A1 Sep. 28, 2023

(30) Foreign Application Priority Data

Mar. 22, 2022 (JP) ................................ 2022-045752

(51) Int. Cl.
*H01R 13/631* (2006.01)
*H01R 12/71* (2011.01)

(52) U.S. Cl.
CPC ......... *H01R 13/6315* (2013.01); *H01R 12/71* (2013.01)

(58) Field of Classification Search
CPC ............................ H01R 13/6315; H01R 12/71
USPC .......................................................... 439/247
See application file for complete search history.

(56) References Cited

U.S. PATENT DOCUMENTS 6,045,380 A * 4/2000 Hashimoto ........ H01R 13/6315 439/248
8,257,095 B2 * 9/2012 Akai .................. H01R 13/6315 439/74
9,627,822 B2 * 4/2017 Hori ....................... H01R 12/91
2009/0029592 A1 1/2009 Matsuzaki et al.
2020/0052424 A1 * 2/2020 Aoki .................... H01R 13/642
2020/0112113 A1 * 4/2020 Aoki ...................... H01R 13/41

(Continued)

FOREIGN PATENT DOCUMENTS

EP 1988608 A1 11/2008
JP 3287514 B2 6/2002

(Continued)

OTHER PUBLICATIONS

Extended European Search Report (EESR) dated Jul. 31, 2023, issued in counterpart European Application No. 23154046.9.

*Primary Examiner* — Harshad C Patel
(74) *Attorney, Agent, or Firm* — Holtz, Holtz & Volek PC

(57) ABSTRACT

A floating connector comprises a fixed housing, a fixed shell, a terminal, a movable housing, a movable shell and a regulating portion. The fixed shell is attached to the fixed housing. The fixed shell is provided with a first shell contact portion. The movable shell is attached to the movable housing. The movable shell is provided with a second shell contact portion. At least one of the first shell contact portion and the second shell contact portion has a resilient property. The first shell contact portion and the second shell contact portion are in contact with each other in an up-down direction by the resilient property of the at least one of the first shell contact portion and the second shell contact portion. The regulating portion regulates a movement of the second shell contact portion away from the first shell contact portion in the up-down direction.

7 Claims, 13 Drawing Sheets

(56) References Cited

U.S. PATENT DOCUMENTS

| | | | | |
|---|---|---|---|---|
| 2020/0381871 | A1* | 12/2020 | Oosaka | H01R 13/405 |
| 2021/0376509 | A1* | 12/2021 | Obata | H01R 43/16 |
| 2021/0376510 | A1* | 12/2021 | Obata | H01R 13/6597 |
| 2022/0021143 | A1* | 1/2022 | Obata | H01R 13/10 |

FOREIGN PATENT DOCUMENTS

| | | | |
|---|---|---|---|
| JP | 6445072 | B2 | 12/2018 |
| JP | 2021093250 | A | 6/2021 |

* cited by examiner

FLOATING CONNECTOR

CROSS REFERENCE TO RELATED APPLICATIONS

This application is based on and claims priority under 35 U.S.C. § 119 to Japanese Patent Applications No. JP 2022-045752 filed Mar. 22, 2022, the contents of which are incorporated herein in their entirety by reference.

BACKGROUND OF THE INVENTION

This invention relates to a floating connector comprising a movable shell.

Referring to FIGS. 22 to 24, JP-A 2021-93250 (Patent Document 1) discloses a floating connector 900 of this type. The floating connector 900 comprises a fixed housing 910, a first shield 920, or a fixed shell 920, terminals 930, a movable housing 940 and second shields 950, or movable shells 950. The fixed shell 920 is attached to the fixed housing 910 and partially covers the fixed housing 910. The fixed shell 920 has fixed-side held portions 922. Each of the terminals 930 has a fixed-side held portion 931, or a first held portion 931, a movable-side held portion 932, or a second held portion 932, a middle resilient portion 933, or a coupling portion 933, a distal end resilient portion 934, or a supporting portion 934 and a contact portion 935, or a contact point 935. The first held portion 931 is held by the fixed housing 910. The second held portion 932 is held by the movable housing 940. The coupling portion 933 is resiliently deformable and couples the first held portion 931 and the second held portion 932 with each other. The supporting portion 934 extends from the second held portion 932 and supports the contact point 935. The movable housing 940 is movable relative to the fixed housing 910 by the resilient deformation of the coupling portion 933. Each of the movable shells 950 is manufactured by punching out a blank from a metal plate, followed by bending the blank. Each of the movable shells 950 is attached to the movable housing 940 and partially covers the movable housing 940. Each of the movable shells 950 has a movable-side shield portion 951, resilient supporting portions 952 and second contact portions 954. The second contact portions 954 are formed on distal ends of the resilient supporting portions 952, respectively. The second contact portion 954 is resiliently brought into contact with the fixed-side held portion 922 from an inside of the fixed-side held portion 922 in an X-direction. This electrically connects the movable shell 950 with the fixed shell 920.

In the floating connector 900 of Patent Document 1, an amount of resilient deformation of the resilient supporting portion 952 of the movable shell 950 must be increased if the movable housing 940 has a large range of motion. As described above, the movable shell 950 is manufactured by punching out the blank from the metal plate, followed by bending the blank. Accordingly, the movable-side shield portion 951 and the resilient supporting portion 952 inevitably have the same thickness. The metal plate must have a certain thickness in order that the strength of the movable-side shield portion 951 is ensured. Thus, there is an inherent limit to reduction in the thickness of the resilient supporting portion 952. Thus, the resilient supporting portion 952 must have an increased spring length in order to increase the amount of the resilient deformation of the resilient supporting portion 952 of the movable shell 950 which is manufactured from the metal plate. The increase of the spring length of the resilient supporting portion 952 is, however, undesirable because the increase of the spring length of the resilient supporting portion 952 results in enlargement of the floating connector 900. In other words, the configuration of the floating connector 900 of Patent Document 1 does not allow the movable housing 940 to have a large range of motion.

SUMMARY OF THE INVENTION

It is therefore an object of the present invention to provide a floating connector with a configuration which enables a movable housing to have a large range of motion.

One aspect of the present invention provides a floating connector. The floating connector is mountable on a circuit board and mateable with a mating connector in an up-down direction. The floating connector comprises a fixed housing, a fixed shell, a terminal, a movable housing, a movable shell and a regulating portion. The fixed shell is fixed to the circuit board when the floating connector is mounted on the circuit board. The fixed shell is attached to the fixed housing. The fixed shell covers, at least in part, the fixed housing in a horizontal plane perpendicular to the up-down direction. The fixed shell is provided with a first shell contact portion. The terminal has a first held portion, a second held portion, a coupling portion, a supporting portion and a contact point. The first held portion is held by the fixed housing. The second held portion is held by the movable housing. The coupling portion is resiliently deformable. The coupling portion couples the first held portion and the second held portion with each other. The supporting portion extends from the second held portion. The supporting portion supports the contact point. The movable housing is movable at least in the horizontal plane relative to the fixed housing by resilient deformation of the coupling portion. The movable shell is attached to the movable housing. The movable shell covers, at least in part, the movable housing in the horizontal plane. The movable shell is provided with a second shell contact portion. At least one of the first shell contact portion and the second shell contact portion has a resilient property. The first shell contact portion and the second shell contact portion are in contact with each other in the up-down direction by the resilient property of the at least one of the first shell contact portion and the second shell contact portion. The regulating portion regulates a movement of the second shell contact portion away from the first shell contact portion in the up-down direction.

The floating connector of the present invention is configured as follows: the fixed shell is provided with the first shell contact portion; the movable shell is provided with the second shell contact portion; the at least one of the first shell contact portion and the second shell contact portion has the resilient property; and the first shell contact portion and the second shell contact portion are in contact with each other in the up-down direction by the resilient property of the at least one of the first shell contact portion and the second shell contact portion. Thus, dissimilar to the floating connector 900 of Patent Document 1, the floating connector of the present invention is configured so that a range of motion of the movable housing does not depend on a configuration in which the fixed shell and the movable shell are in contact with each other. In other words, the floating connector of the present invention has a configuration which enables the movable housing to have a large range of motion.

An appreciation of the objectives of the present invention and a more complete understanding of its structure may be had by studying the following description of the preferred embodiment and by referring to the accompanying drawings.

Figure 1:
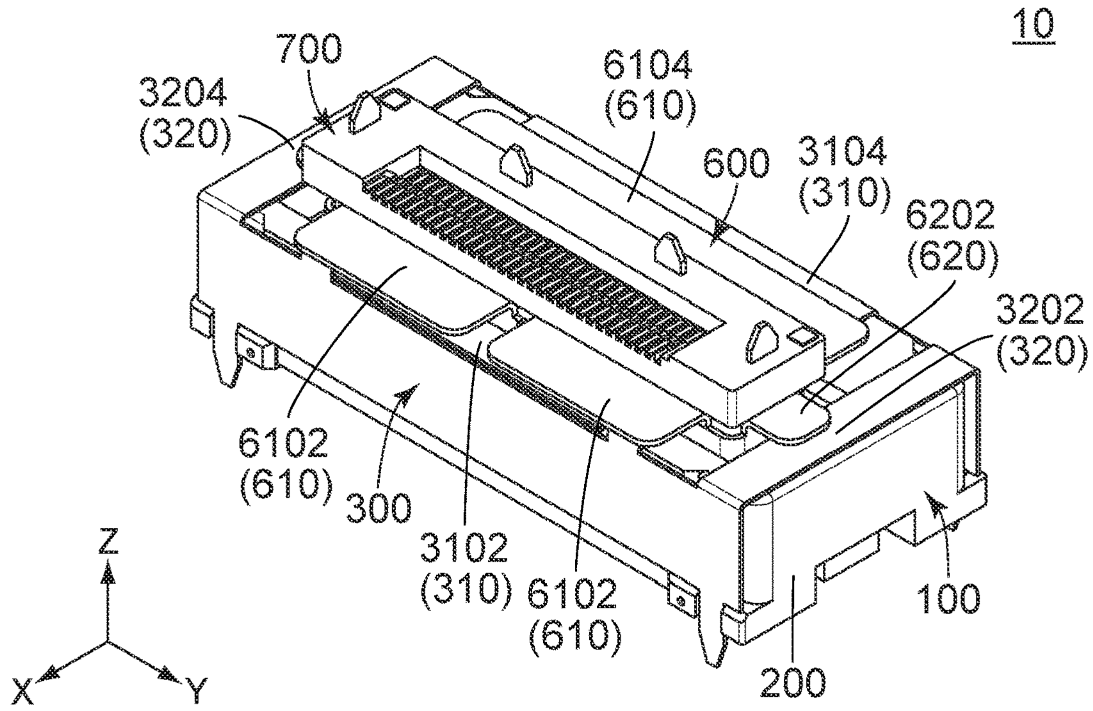
FIG. 1 is a perspective view showing an assembly according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, an assembly 10 according to an embodiment of the present invention comprises a floating connector 100 and a mating connector 700.

Figure 4:
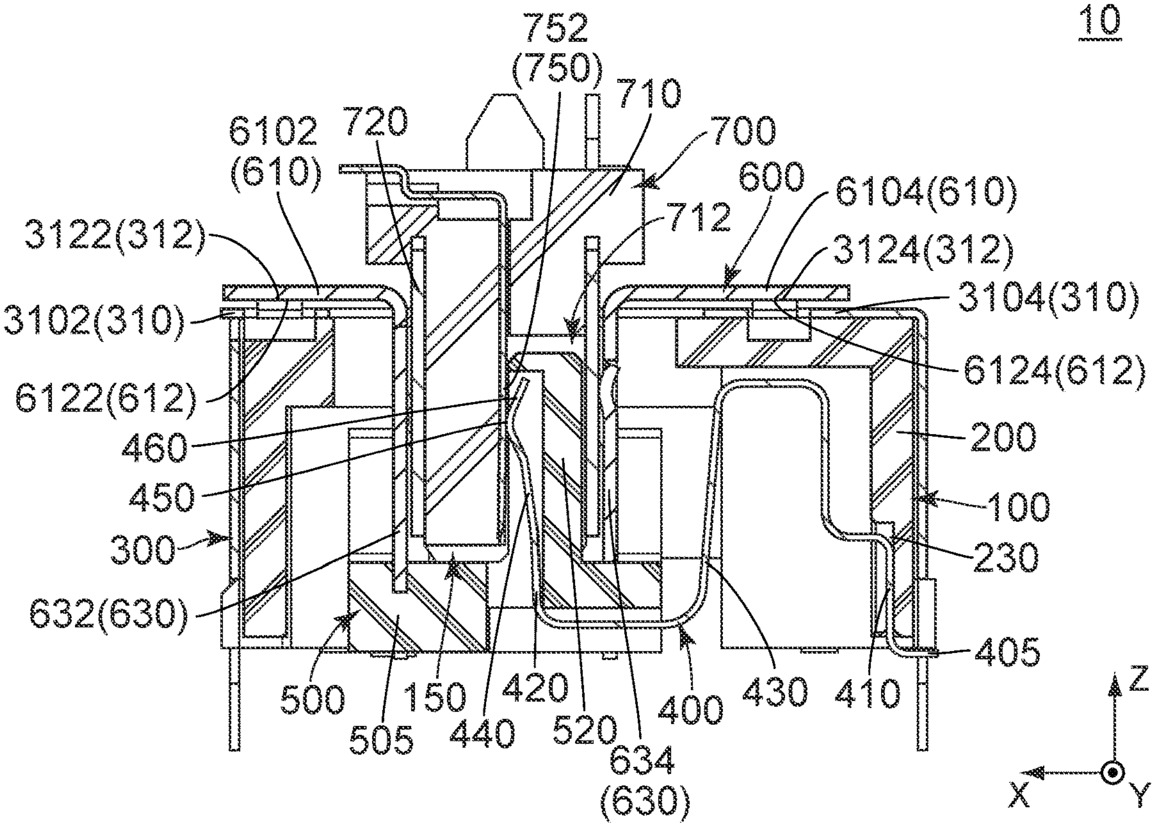
FIG. 4 is a cross-sectional view showing the assembly of FIG. 3, taken along line A-A.
Figure 19:
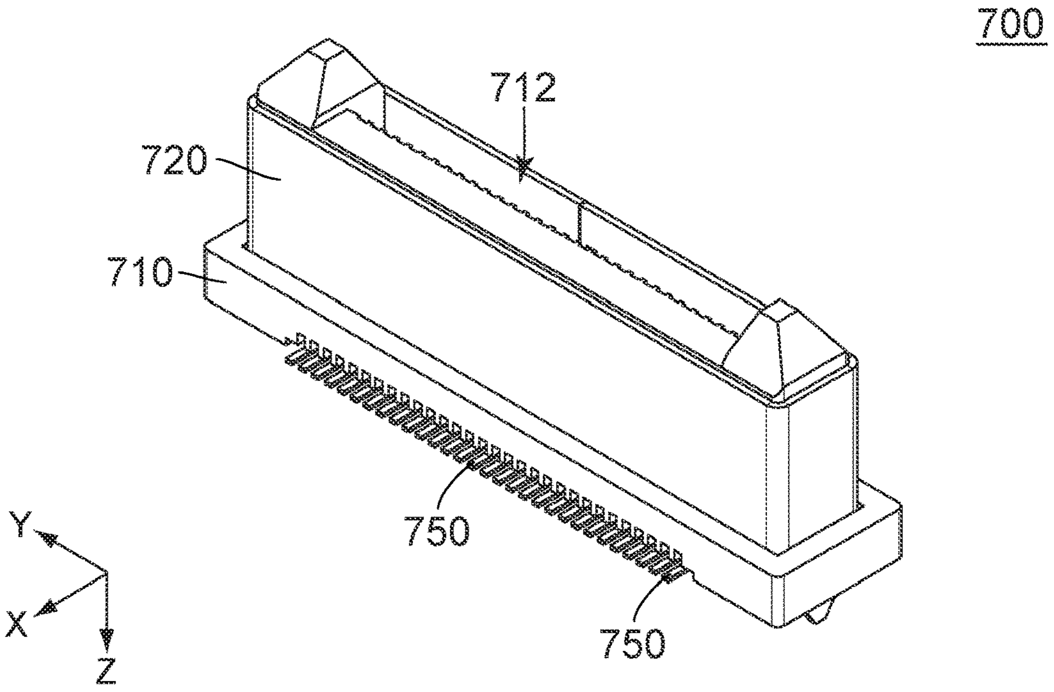
FIG. 19 is a perspective view showing a mating connector which is included in the assembly of FIG. 1.
Figure 20:
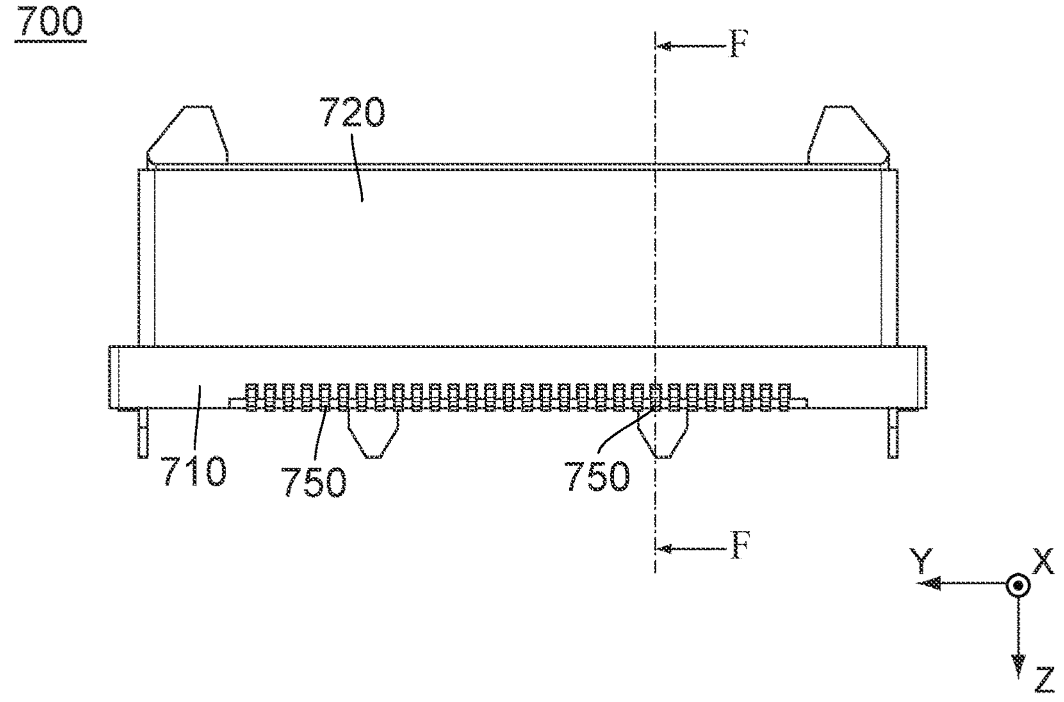
FIG. 20 is a front view showing the mating connector of FIG. 19.

As shown in FIG. 4, the mating connector 700 of the present embodiment is mateable with the floating connector 100 in an up-down direction. In the present embodiment, the up-down direction is a Z-direction. Specifically, it is assumed that upward is a positive Z-direction while downward is a negative Z-direction. The mating connector 700 is mountable on a circuit board (not shown). As shown in FIG. 19, the mating connector 700 comprises a mating housing 710, a plurality of mating terminals 750 and a mating shell 720.

Figure 21:
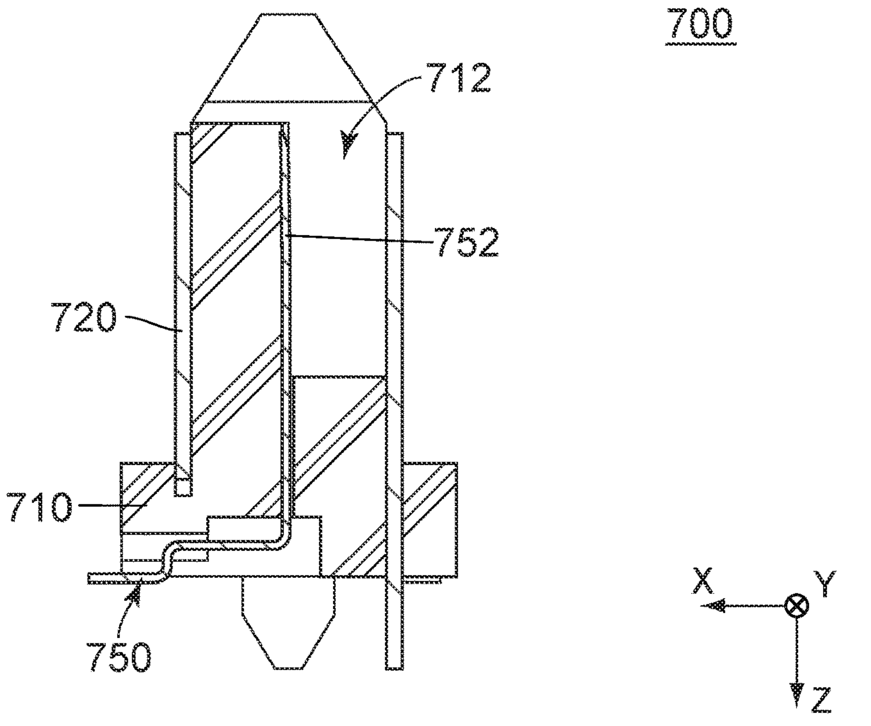
FIG. 21 is a cross-sectional view showing the mating connector of FIG. 20, taken along line F-F.
Figure 22:
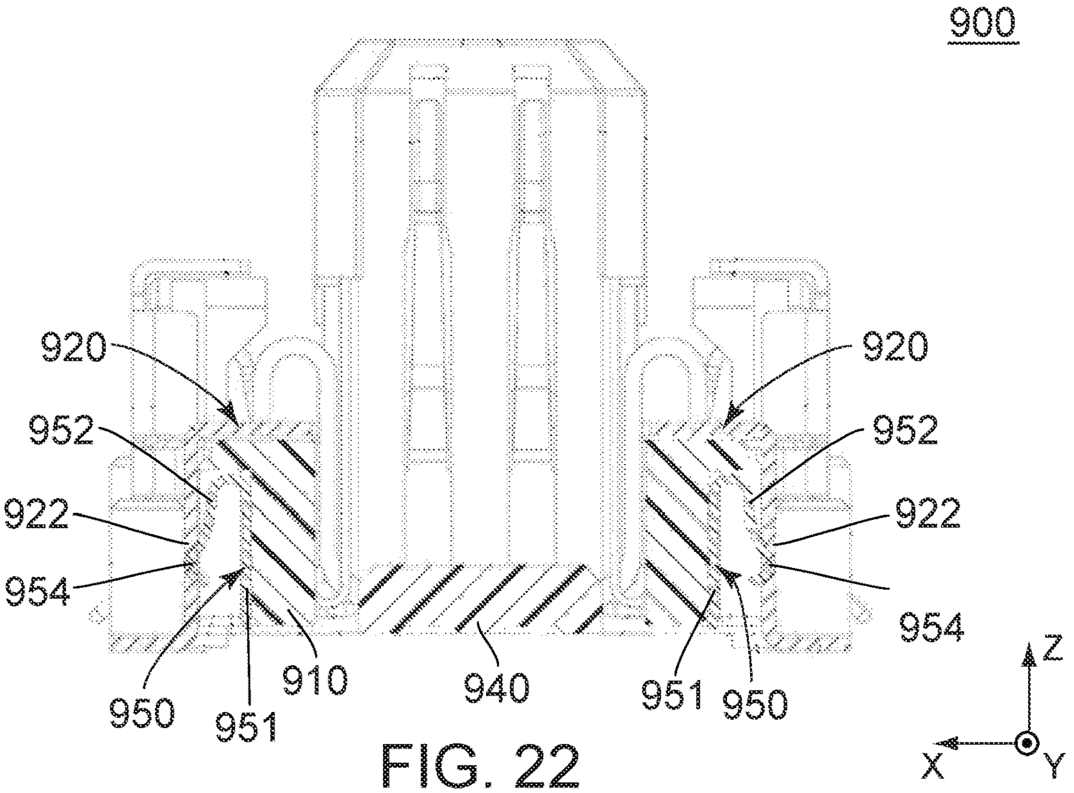
FIG. 22 PRIOR ART
FIG. 22 is a cross-sectional view showing a floating connector of Patent Document 1.
Figure 23:
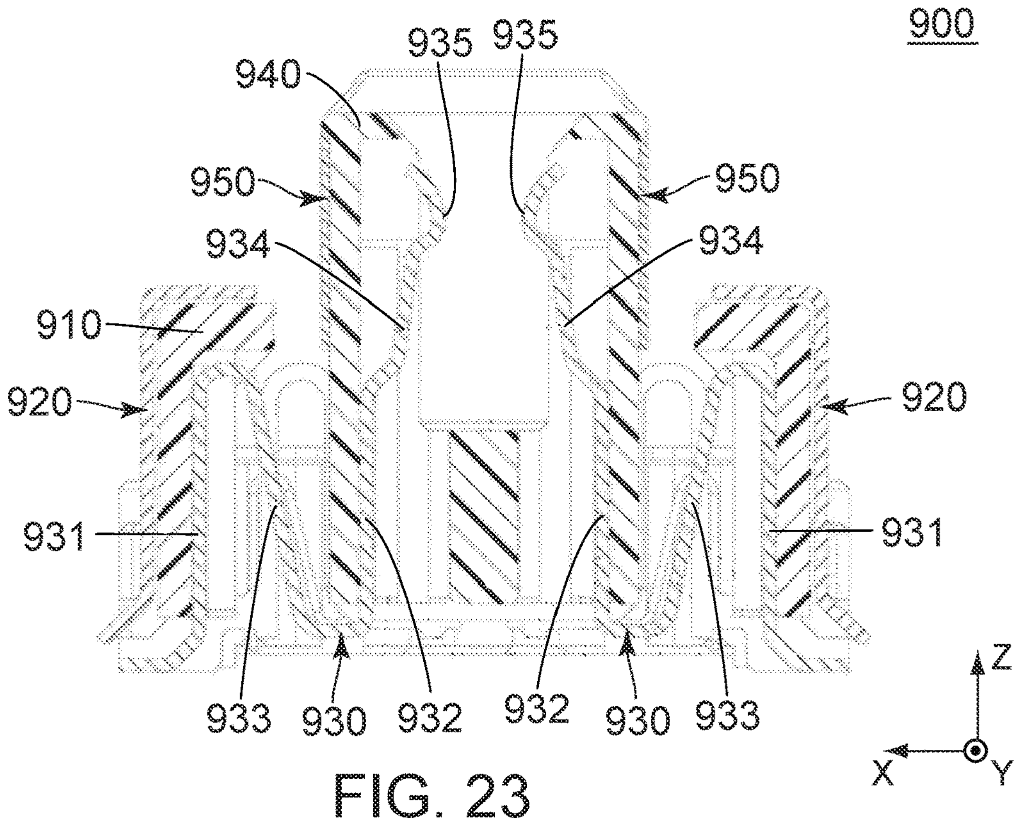
FIG. 23 PRIOR ART
FIG. 23 is another cross-sectional view showing the floating connector of FIG. 22.
Figure 24:
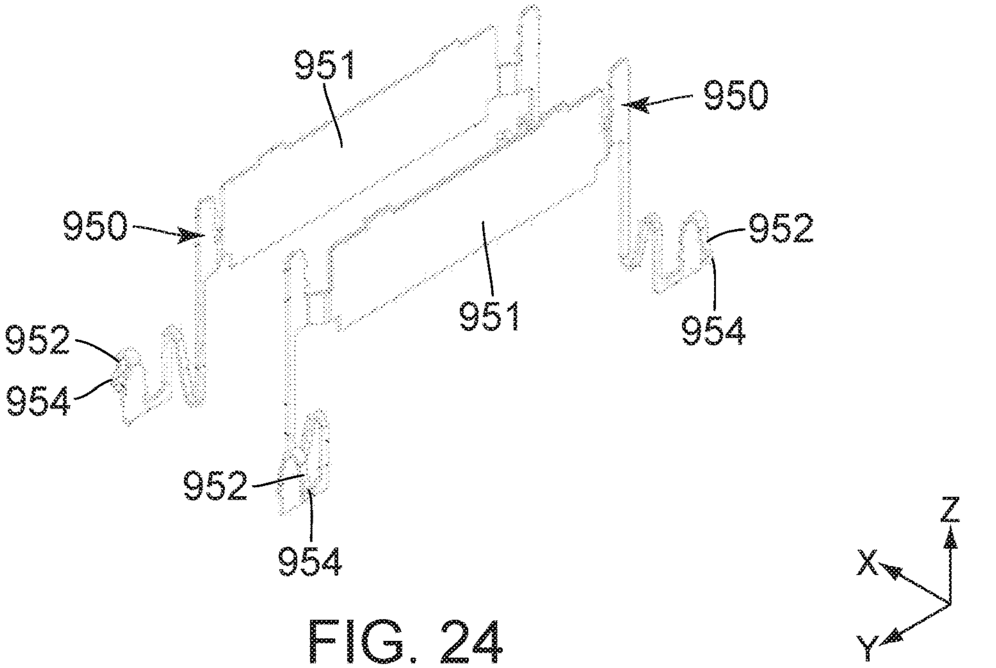
FIG. 24 PRIOR ART
FIG. 24 is a perspective view showing second shields which are included in the floating connector of FIG. 22.

Referring to FIG. 21, the mating housing 710 of the present embodiment is made of insulator. The mating housing 710 has a protruding portion accommodating portion 712.

As shown in FIG. 21, the protruding portion accommodating portion 712 of the present embodiment is recessed upward in the up-down direction.

Referring to FIG. 21, each of the mating terminals 750 of the present embodiment is made of metal. The mating terminals 750 are held by the mating housing 710. Each of the mating terminals 750 has a mating contact portion 752.

As shown in FIG. 21, the mating contact portion 752 of the present embodiment extends in the up-down direction. The mating contact portion 752 is exposed in the protruding portion accommodating portion 712.

Referring to FIG. 21, the mating shell 720 of the present embodiment is made of metal. The mating shell 720 is held by the mating housing 710. The mating shell 720 partially covers the mating housing 710 in a horizontal plane perpendicular to the up-down direction. In the present embodiment, the horizontal plane perpendicular to the up-down direction is an XY-plane.

Figure 11:
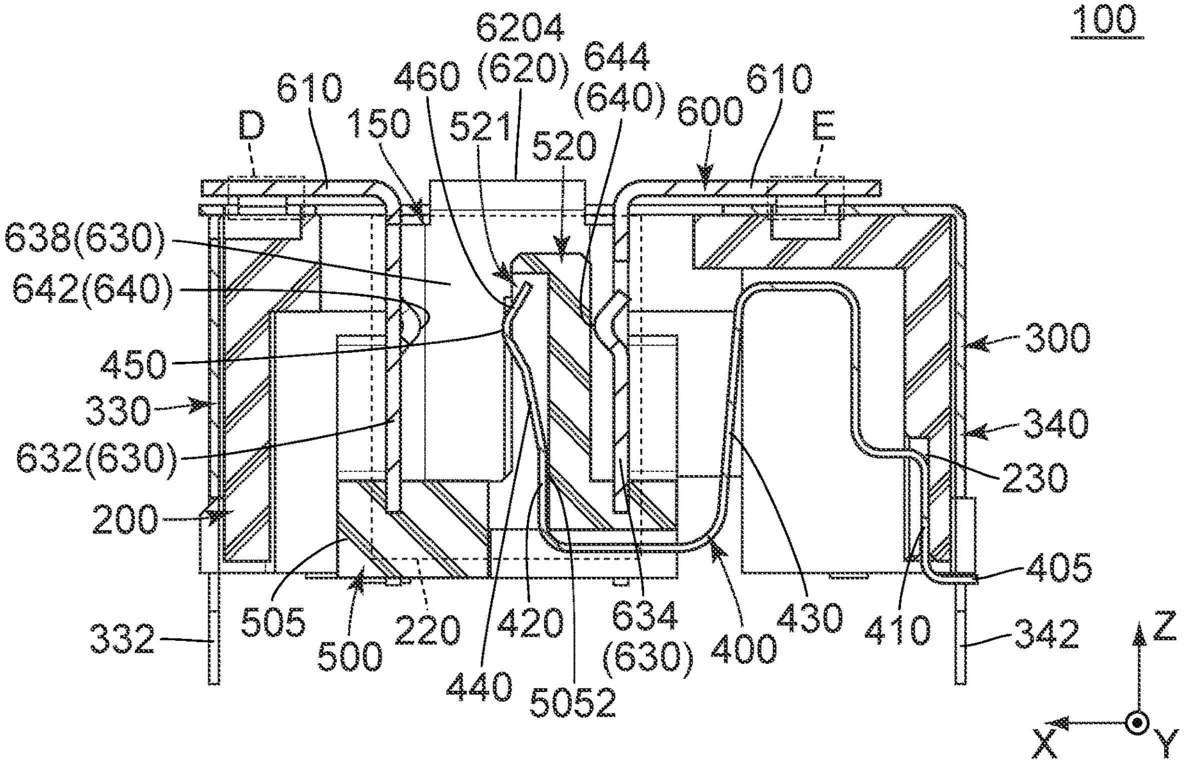
FIG. 11 is a cross-sectional view showing the floating connector of FIG. 10, taken along line B-B.

Referring to FIG. 11, the floating connector 100 of the present embodiment is mountable on a circuit board (not shown). Referring to FIG. 4, the floating connector 100 is mateable with the mating connector 700 in the up-down direction.

Figure 14:
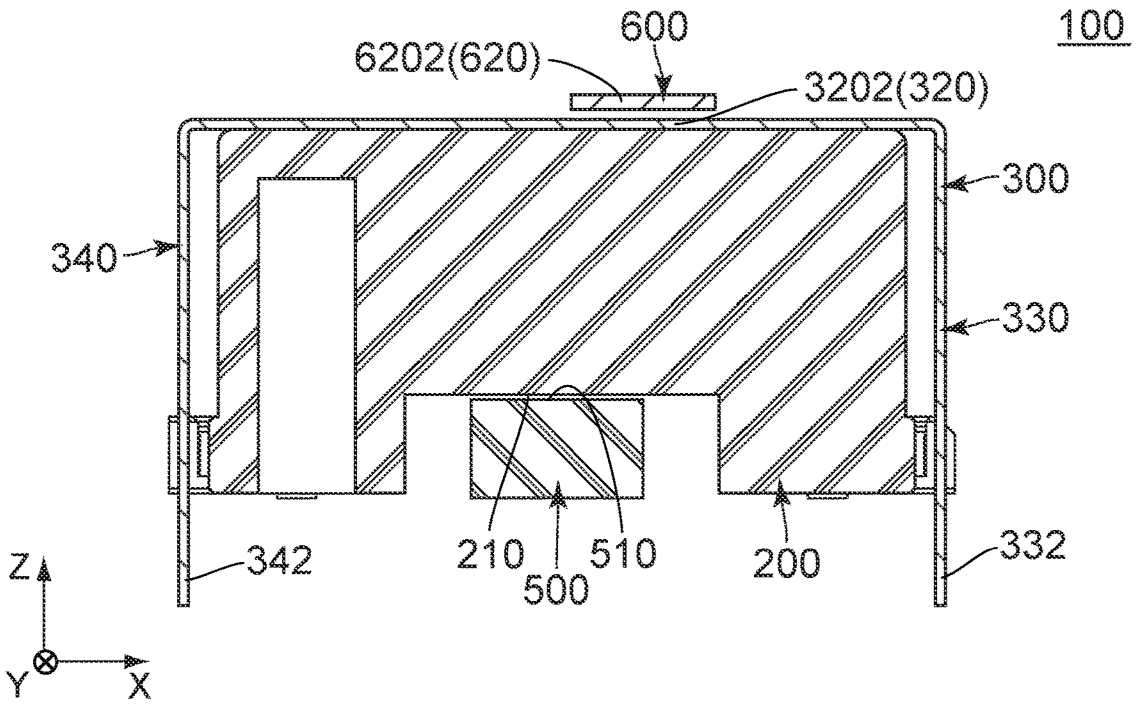
FIG. 14 is a cross-sectional view showing the floating connector of FIG. 10, taken along line C-C.

As shown in FIGS. 11 and 14, the floating connector 100 comprises a mating connector receiving portion 150, a fixed housing 200, regulating portions 210, a movable housing 500, terminals 400, a fixed shell 300 and a movable shell 600.

As shown in FIG. 11, the mating connector receiving portion 150 of the present embodiment opens upward in the up-down direction. As shown in FIG. 4, the mating connector receiving portion 150 receives a part of the mating connector 700 when the floating connector 100 and the mating connector 700 are mated with each other.

Figure 17:
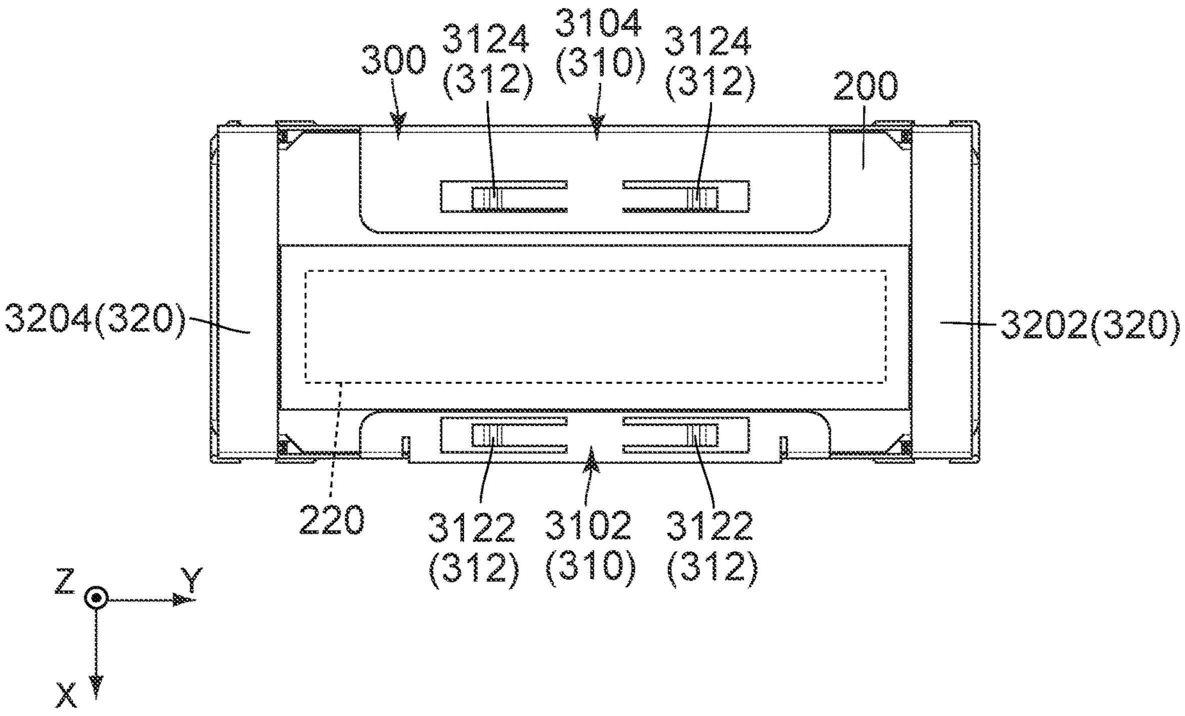
FIG. 17 is a top view showing the fixed shell and the fixed housing which are included in the floating connector of FIG. 15.

Referring to FIG. 17, the fixed housing 200 of the present embodiment is made of insulator. The fixed housing 200 has an accommodating portion 220.

Figure 16:
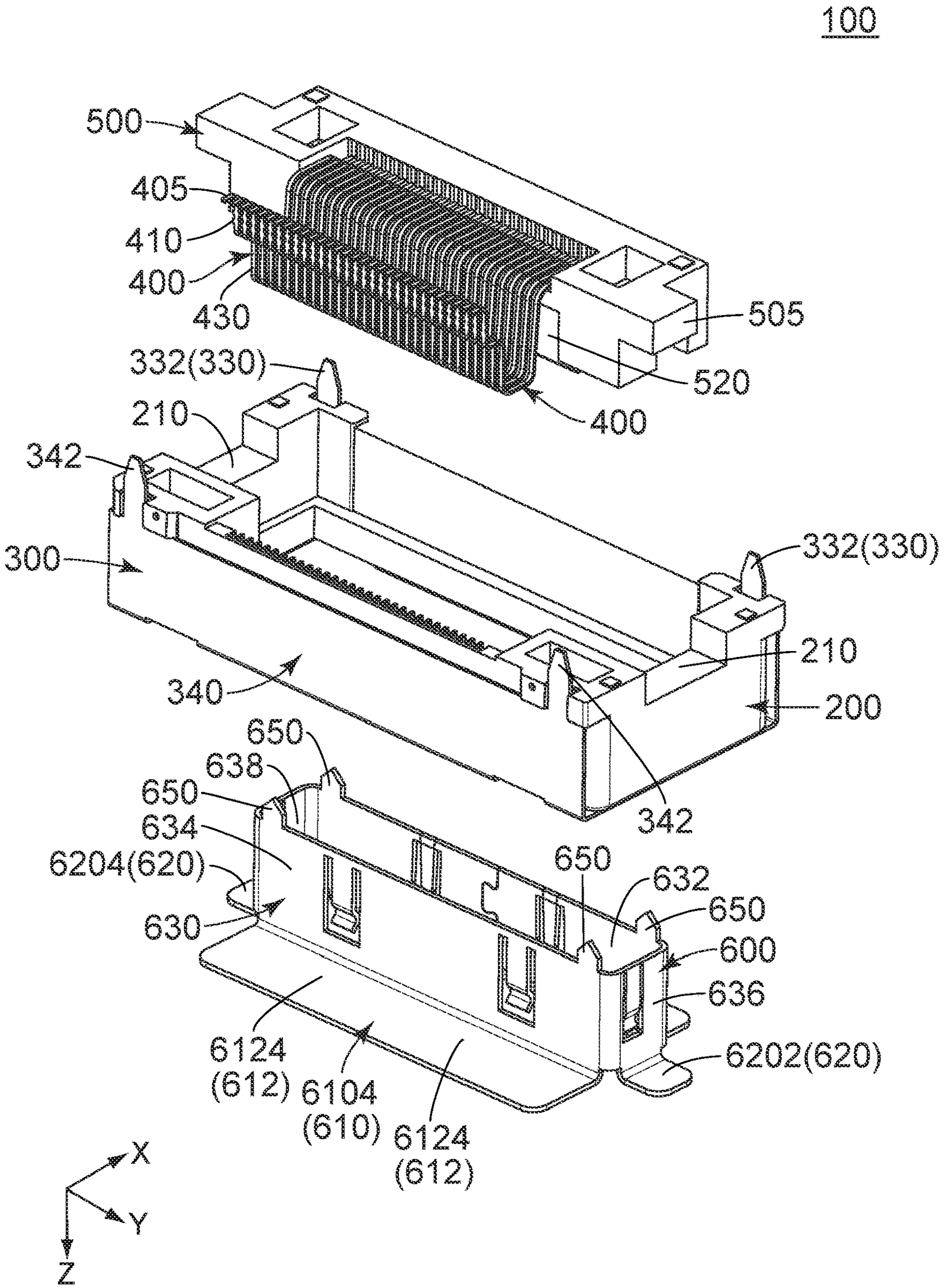
FIG. 16 is another exploded, perspective view showing the floating connector of FIG. 15.

As shown in FIG. 17, the accommodating portion 220 of the present embodiment opens upward in the up-down direction. Referring to FIGS. 16 and 17, the accommodating portion 220 opens downward in the up-down direction. As shown in FIG. 11, the accommodating portion 220 accommodates, at least in part, any of the movable housing 500 and the movable shell 600.

Figure 18:
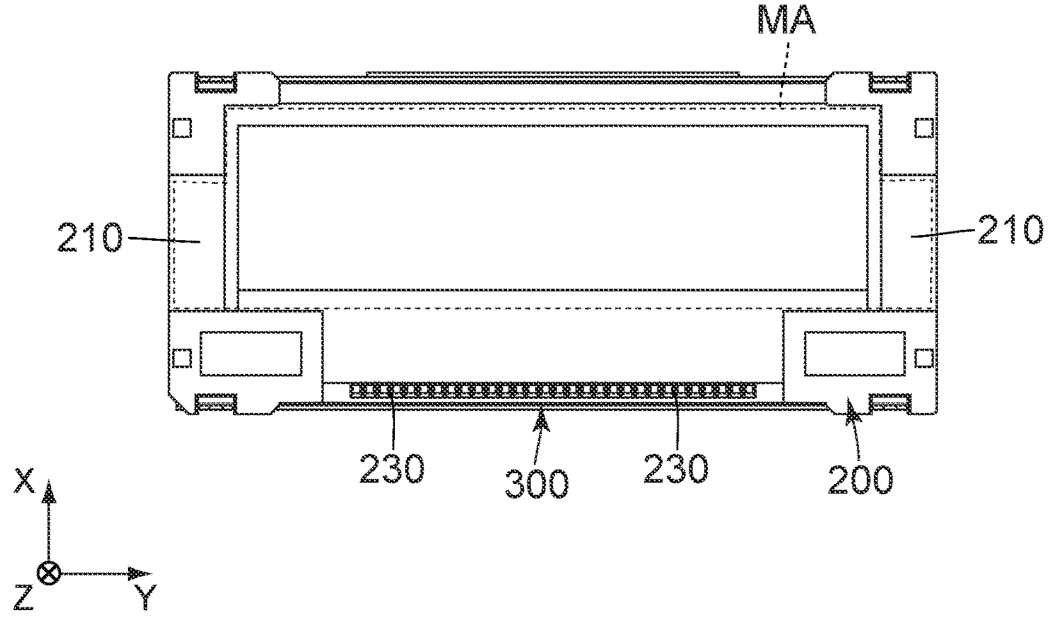
FIG. 18 is a bottom view showing the fixed shell and the fixed housing of FIG. 17.

As shown in FIG. 18, the fixed housing 200 has a plurality of first holding portions 230.

Referring to FIG. 11, the first holding portions 230 of the present embodiment correspond to the terminals 400, respectively. Each of the first holding portions 230 is positioned in the vicinity of a rear end of the fixed housing 200 in a front-rear direction. In the present embodiment, the front-rear direction is an X-direction. Specifically, forward is a positive X-direction while rearward is a negative X-direction.

As shown in FIG. 18, the number of the regulating portions 210 of the present embodiment is two. However, the present embodiment is not limited thereto, but the number of the regulating portion 210 may be one. The regulating portions 210 are positioned at opposite ends, respectively, of the fixed housing 200 in a pitch direction. In the present embodiment, the pitch direction is a Y-direction. Additionally, the pitch direction is also referred to as a right-left direction. Specifically, it is assumed that rightward is a positive Y-direction while leftward is a negative Y-direction. As shown in FIG. 16, each of the regulating portions 210 is a plane facing downward in the up-down direction. Each of the regulating portions 210 is a part of the fixed housing 200.

Figure 15:
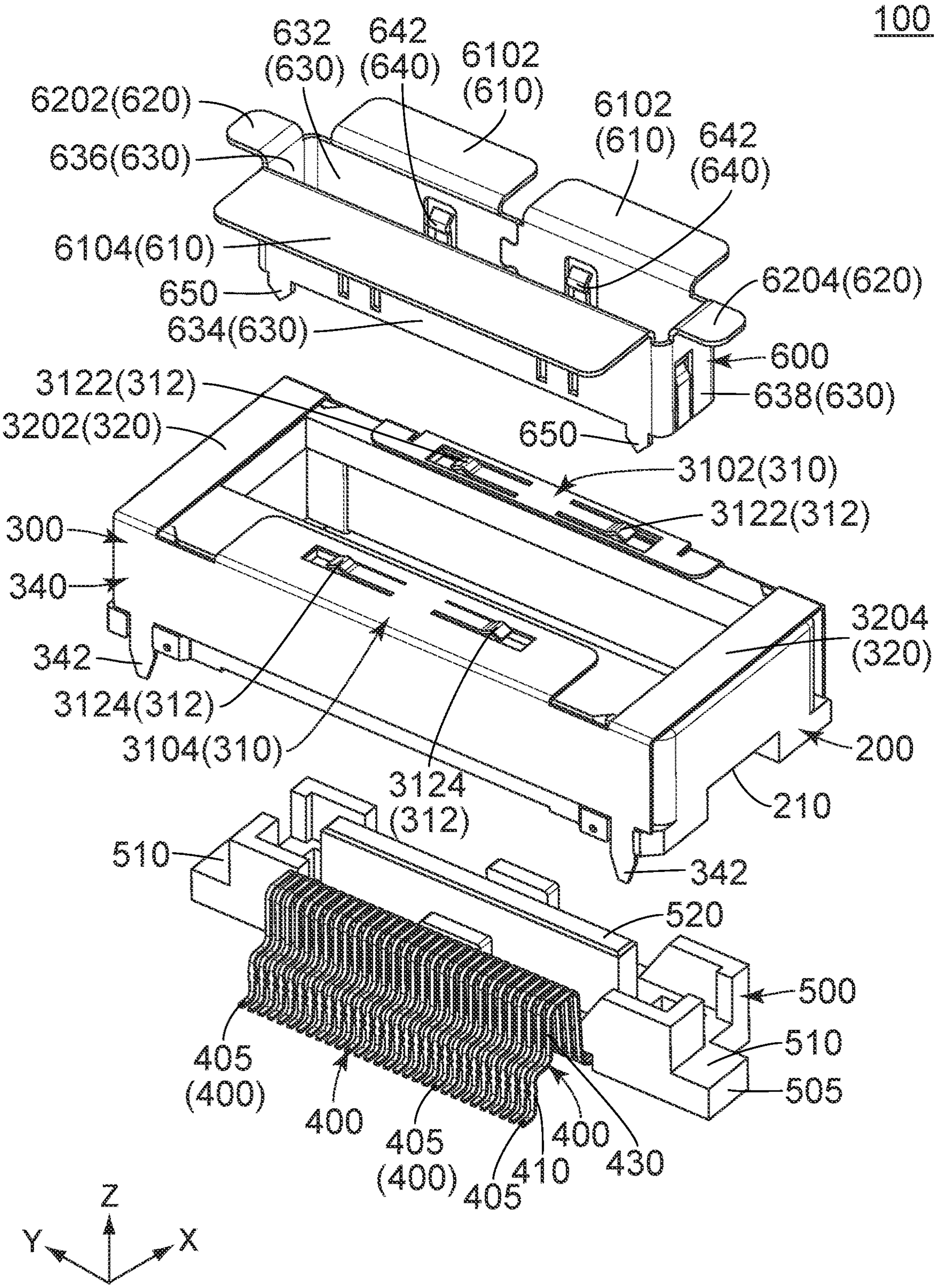
FIG. 15 is an exploded, perspective view showing the floating connector of FIG. 5. In the figure, a fixed shell is attached to a fixed housing, and a movable shell is not attached to a movable housing.

Referring to FIG. 15, the movable housing 500 of the present embodiment is made of insulator. The movable housing 500 has a base portion 505 and a protruding portion 520.

Figure 10:
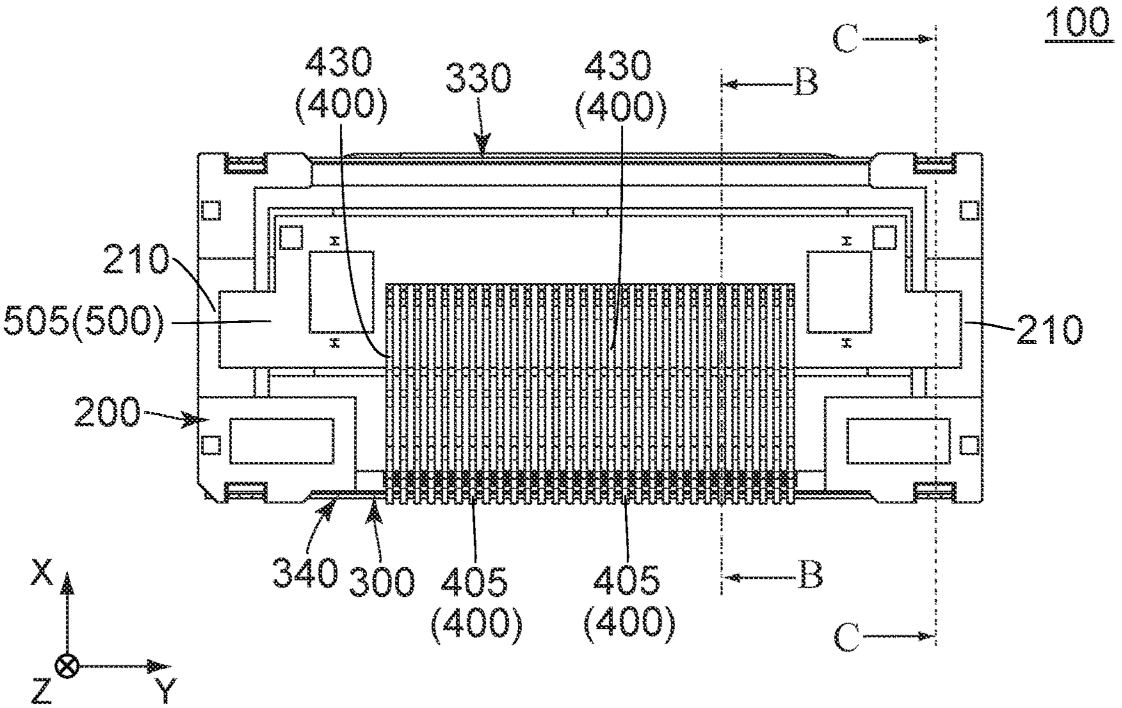
FIG. 10 is a bottom view showing the floating connector of FIG. 5.

As shown in FIG. 11, the base portion 505 of the present embodiment defines a lower end of the movable housing 500 in the up-down direction. As shown in FIG. 10, the base portion 505 defines outer ends of the movable housing 500 in the pitch direction. Referring to FIGS. 11 and 15, the base portion 505 has two regulated portions 510 and a plurality of second holding portions 5052.

As shown in FIG. 15, the regulated portions 510 of the present embodiment are positioned at opposite ends, respectively, of the base portion 505 in the pitch direction. Each of the regulated portions 510 is a plane facing upward in the up-down direction.

Referring to FIG. 11, the second holding portions 5052 of the present embodiment correspond to the terminals 400, respectively. Each of the second holding portions 5052 is positioned around a middle of the movable housing 500 in the front-rear direction.

Figure 6:
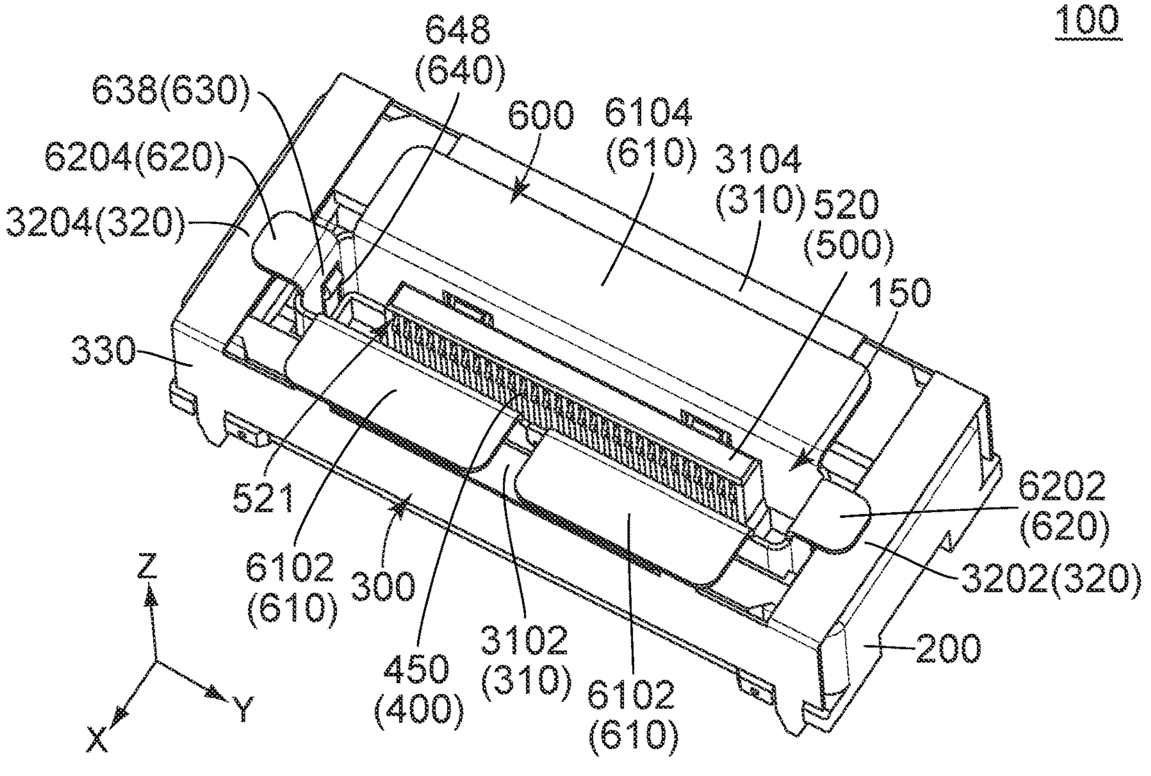
FIG. 6 is another perspective view showing the floating connector of FIG. 5.

As shown in FIG. 11, the protruding portion 520 of the present embodiment extends upward in the up-down direction from the base portion 505. As shown in FIG. 4, the protruding portion 520 is accommodated in the protruding portion accommodating portion 712 when the floating connector 100 and the mating connector 700 are mated with each other. As shown in FIG. 6, the protruding portion 520 has a plurality of terminal accommodating portions 521.

As shown in FIG. 11, each of the terminal accommodating portions 521 of the present embodiment is a space extending in the up-down direction. The terminal accommodating portions 521 correspond to the terminals 400, respectively. Each of the terminal accommodating portions 521 accommodates a part of the terminal 400 corresponding thereto.

Referring to FIG. 15, each of the terminals 400 of the present embodiment is made of metal. The terminals 400 have shapes same as each other. The terminals 400 are arranged in the pitch direction. In the present embodiment, the terminals 400 form a single terminal row. However, the present invention is not limited thereto, but the terminals 400 may form two terminal rows which are arranged in the front-rear direction.

As shown in FIG. 11, each of the terminals 400 has a fixed portion 405, a first held portion 410, a second held portion 420, a coupling portion 430, a supporting portion 440, a contact point 450 and a guide portion 460.

Referring to FIG. 11, the fixed portion 405 of the present embodiment is fixed to the circuit board by soldering or the like when the floating connector 100 is mounted on the circuit board. The fixed portion 405 extends outward in the front-rear direction from the first held portion 410. Specifically, the fixed portion 405 extends rearward in the front-rear direction from the first held portion 410. The fixed portion 405 defines a rear end of the terminal 400 in the front-rear direction. The fixed portion 405 defines a lower end of the terminal 400 in the up-down direction. Referring to FIGS. 11 and 14, each of the regulating portions 210 is positioned above any of the fixed portions 405 of the terminals 400 in the up-down direction. Each of the regulated portions 510 is positioned above any of the fixed portions 405 of the terminals 400 in the up-down direction.

As shown in FIG. 11, the first held portion 410 of the present embodiment extends upward in the up-down direction from the fixed portion 405. The first held portion 410 is held by the fixed housing 200. The first held portion 410 is held by the first holding portion 230. More specifically, the first held portion 410 is press-fit into the first holding portion 230.

As shown in FIG. 11, the second held portion 420 of the present embodiment extends upward in the up-down direction from the coupling portion 430. The second held portion 420 is held by the movable housing 500. The second held portion 420 is held by the second holding portion 5052. More specifically, the second held portion 420 is press-fit into the second holding portion 5052.

As shown in FIG. 11, the coupling portion 430 of the present embodiment extends forward in the front-rear direction from the first held portion 410. The coupling portion 430 extends rearward in the front-rear direction from the second held portion 420. The coupling portion 430 couples the first held portion 410 and the second held portion 420 with each other. The coupling portion 430 is resiliently deformable. The movable housing 500 is movable at least in the horizontal plane relative to the fixed housing 200 by the resilient deformation of the coupling portion 430. More specifically, referring to FIGS. 10, 11 and 18, the movable housing 500 is movable within a movable range MA in the horizontal plane relative to the fixed housing 200 by the resilient deformation of the coupling portion 430.

As shown in FIG. 11, the supporting portion 440 of the present embodiment extends from the second held portion 420. More specifically, the supporting portion 440 extends upward and forward from the second held portion 420. The supporting portion 440 is resiliently deformable. The supporting portion 440 is positioned in the accommodating portion 220. The supporting portion 440 is positioned in the mating connector receiving portion 150. A part of the supporting portion 440 is positioned in the terminal accommodating portion 521. The supporting portion 440 is positioned above the base portion 505 in the up-down direction. The supporting portion 440 supports the contact point 450. Specifically, the supporting portion 440 resiliently supports the contact point 450.

As shown in FIG. 4, the contact point 450 of the present embodiment is brought into contact with the mating terminal 750 when the floating connector 100 is mated with the mating connector 700. More specifically, the contact point 450 is brought into contact with the mating contact portion 752 when the floating connector 100 is mated with the mating connector 700. As shown in FIG. 11, the contact point 450 is positioned in the accommodating portion 220. The contact point 450 is positioned in the mating connector receiving portion 150. The contact point 450 is positioned outside the terminal accommodating portion 521. More specifically, the contact point 450 is positioned forward of the terminal accommodating portion 521 in the front-rear direction. The contact point 450 is supported by the supporting portion 440. Since the supporting portion 440 is resiliently deformable as described above, the contact point 450 is movable in the front-rear direction. The contact point 450 faces forward in the front-rear direction. Referring to FIGS. 11 and 14, each of the regulating portions 210 is positioned below any of the contact points 450 of the terminals 400 in the up-down direction. Each of the regulated portions 510 is positioned below any of the contact points 450 of the terminals 400 in the up-down direction.

Referring to FIG. 4, the guide portion 460 of the present embodiment guides the mating terminal 750 when the floating connector 100 is mated with the mating connector 700. As shown in FIG. 11, the guide portion 460 extends from the contact point 450. Specifically, the guide portion 460 extends upward and rearward from the contact point 450. The guide portion 460 defines an upper end of the terminal 400 in the up-down direction. An upper end of the guide portion 460 is a free end. The upper end of the guide portion 460 is positioned in the terminal accommodating portion 521.

Referring to FIG. 15, the fixed shell 300 of the present embodiment is made of metal. The fixed shell 300 is fixed to the circuit board when the floating connector 100 is mounted on the circuit board. The fixed shell 300 is attached to the fixed housing 200. The fixed shell 300 covers, at least in part, the fixed housing 200 in the horizontal plane perpendicular to the up-down direction. The fixed shell 300 defines outer ends of the floating connector 100 in the front-rear direction.

Figure 8:
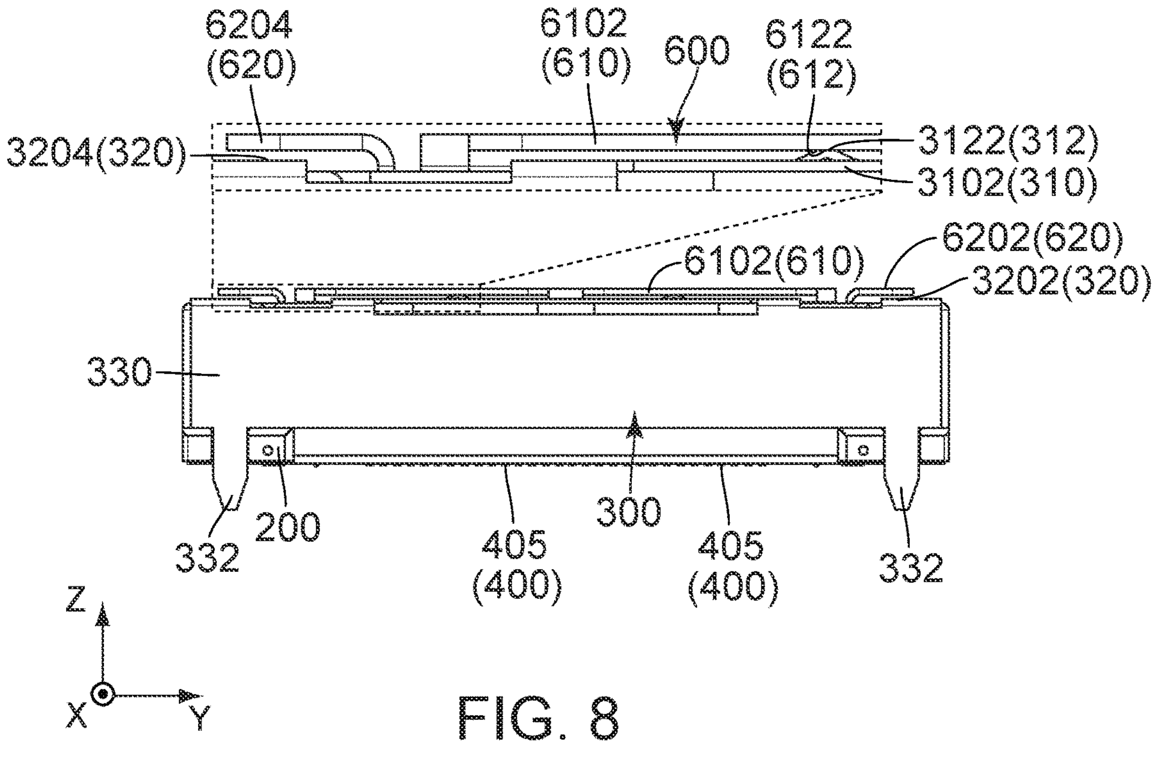
FIG. 8 is a front view showing the floating connector of FIG. 5. In the figure, a part of the floating connector is enlarged and illustrated.

As shown in FIGS. 8 and 15, the fixed shell 300 has a front plate portion 330, a rear plate portion 340 and first plate portions 310.

Figure 9:
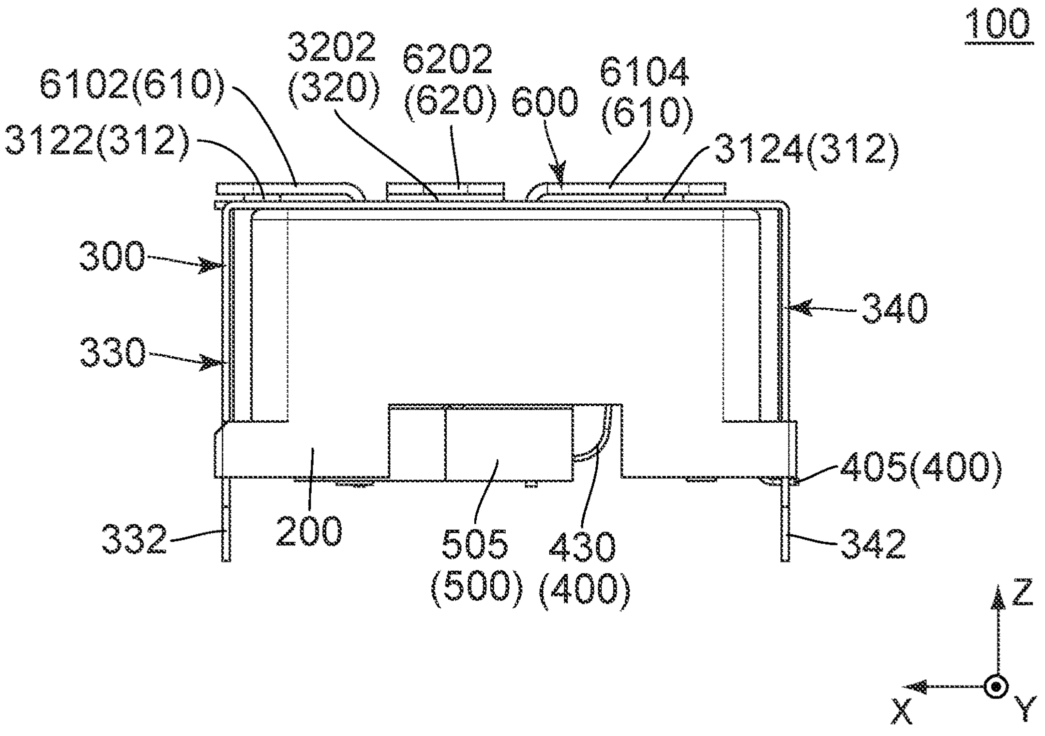
FIG. 9 is a side view showing the floating connector of FIG. 5.

Referring to FIGS. 8 and 9, the front plate portion 330 of the present embodiment has a flat-plate shape perpendicular to the front-rear direction. The front plate portion 330 is positioned forward of the rear plate portion 340 in the front-rear direction. The front plate portion 330 defines a front end of the floating connector 100 in the front-rear direction. As shown in FIG. 11, the front plate portion 330 is positioned forward of the fixed housing 200 in the front-rear direction. The front plate portion 330 is positioned forward of the movable housing 500 in the front-rear direction. The front plate portion 330 is positioned forward of the accommodating portion 220 in the front-rear direction.

As shown in FIG. 8, the front plate portion 330 has two front fixed portions 332.

As shown in FIG. 11, each of the front fixed portions 332 defines a lower end of the front plate portion 330 in the up-down direction. Each of the front fixed portions 332 defines a lower end of the fixed shell 300 in the up-down direction. Each of the front fixed portions 332 is positioned below the fixed housing 200 in the up-down direction. Each of the front fixed portions 332 is positioned below the movable housing 500 in the up-down direction. Each of the front fixed portions 332 defines a lower end of the floating connector 100 in the up-down direction. Each of the front fixed portions 332 is fixed to the circuit board when the floating connector 100 is mounted on the circuit board.

As shown in FIG. 15, the rear plate portion 340 of the present embodiment has a flat-plate shape perpendicular to the front-rear direction. The rear plate portion 340 defines a rear end of the floating connector 100 in the front-rear direction. The rear plate portion 340 is positioned rearward of any of the first plate portions 310 in the front-rear direction. As shown in FIG. 11, the rear plate portion 340 is positioned rearward of the front plate portion 330 in the front-rear direction. The rear plate portion 340 is positioned rearward of the fixed housing 200 in the front-rear direction. The rear plate portion 340 is positioned rearward of the movable housing 500 in the front-rear direction. The rear plate portion 340 is positioned rearward of the accommodating portion 220 in the front-rear direction.

As shown in FIG. 16, the rear plate portion 340 has two rear fixed portions 342.

As shown in FIG. 11, each of the rear fixed portions 342 defines a lower end of the rear plate portion 340 in the up-down direction. Each of the rear fixed portions 342 defines the lower end of the fixed shell 300 in the up-down direction. Each of the rear fixed portions 342 is positioned below the fixed housing 200 in the up-down direction. Each of the rear fixed portions 342 is positioned below the movable housing 500 in the up-down direction. Each of the rear fixed portions 342 defines the lower end of the floating connector 100 in the up-down direction. Each of the rear fixed portions 342 is fixed to the circuit board when the floating connector 100 is mounted on the circuit board.

Figure 12:
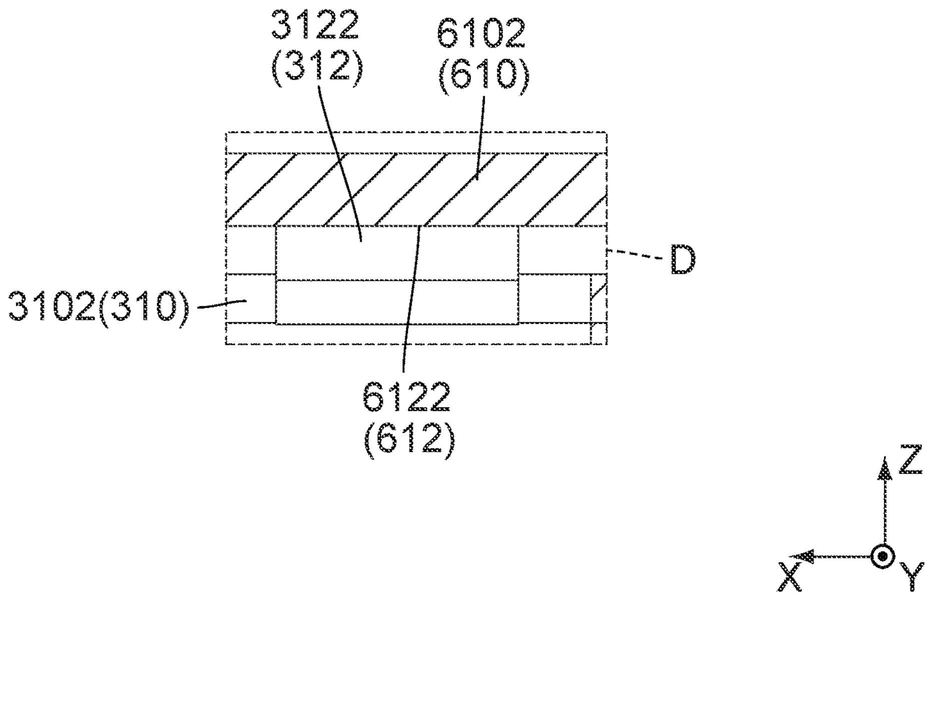
FIG. 12 is an enlarged, cross-sectional view showing a part of the floating connector which is enclosed by broken line D of FIG. 11.
Figure 13:
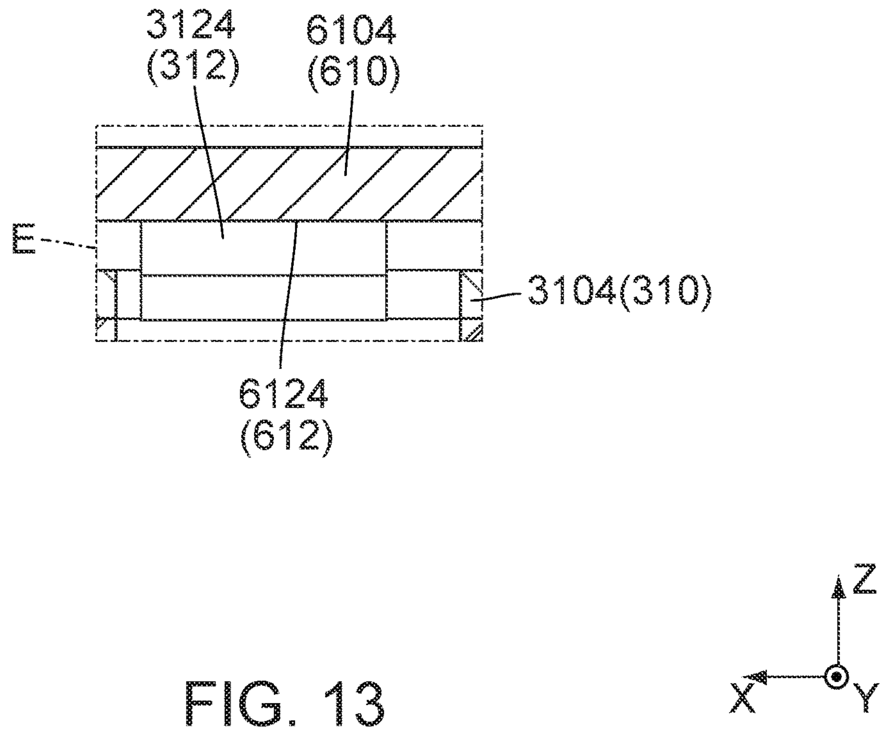
FIG. 13 is an enlarged, cross-sectional view showing a part of the floating connector which is enclosed by broken line E of FIG. 11.

As shown in FIG. 17, the number of the first plate portions 310 of the present embodiment is two. However, the present invention is not limited thereto, but the number of the first plate portion 310 may be one. The first plate portions 310 are arranged in the front-rear direction. The accommodating portion 220 is positioned between the two first plate portions 310 in the front-rear direction. Each of the first plate portions 310 is positioned outside the accommodating portion 220 in the horizontal plane perpendicular to the up-down direction. Each of the first plate portions 310 is positioned outside the accommodating portion 220 in the front-rear direction. In the pitch direction, a position of each of the first plate portions 310 overlaps with a position of the accommodating portion 220. Referring to FIGS. 17 and 18, each of the first plate portions 310 is positioned between the two regulating portions 210 in the pitch direction. As shown in FIGS. 12 and 13, the first plate portions 310 are positioned at positions same as each other in the up-down direction. Each of the first plate portions 310 is positioned above the fixed housing 200 in the up-down direction. Each of the first plate portions 310 is positioned above the movable housing 500 in the up-down direction. Each of the first plate portions 310 is positioned above any of the terminals 400 in the up-down direction. More specifically, each of the first plate portions 310 is positioned above the upper end of the guide portion 460 in the up-down direction. Referring to FIG. 15, each of the first plate portion 310 is positioned between the two regulated portions 510 in the pitch direction.

As shown in FIG. 17, each of the first plate portions 310 is provided with two first shell contact portions 312. In other words, the fixed shell 300 is provided with four of the first shell contact portions 312. However, the present invention is not limited thereto, but the fixed shell 300 should be provided with one of the first shell contact portion 312. Referring to FIGS. 12 and 13, each of the first shell contact portions 312 has a resilient property. Each of the first shell contact portions 312 is resiliently deformable in the up-down direction. Each of the first shell contact portions 312 protrudes upward in the up-down direction.

As shown in FIG. 17, the first plate portions 310 include a front first plate portion 3102 and a rear first plate portion 3104.

As shown in FIG. 11, the front first plate portion 3102 of the present embodiment is positioned at a position same as a position of the rear first plate portion 3104 in the up-down direction. The front first plate portion 3102 is positioned above the fixed housing 200 in the up-down direction. The front first plate portion 3102 is positioned above the movable housing 500 in the up-down direction. The front first plate portion 3102 is positioned above any of the terminals 400 in the up-down direction. The front first plate portion 3102 is positioned above the upper end of the guide portion 460 in the up-down direction. The front first plate portion 3102 is positioned forward of the accommodating portion 220 in the front-rear direction. As shown in FIG. 17, in the pitch direction, a position of the front first plate portion 3102 overlaps with the position of the accommodating portion 220. The front first plate portion 3102 and the rear first plate portion 3104 are positioned at positions same as each other in the pitch direction.

As shown in FIG. 15, the rear first plate portion 3104 of the present embodiment extends forward in the front-rear direction from the rear plate portion 340. As shown in FIGS. 11 and 13, the rear first plate portion 3104 is positioned above the fixed housing 200 in the up-down direction. The rear first plate portion 3104 is positioned above the movable housing 500 in the up-down direction. The rear first plate portion 3104 is positioned above any of the terminals 400 in the up-down direction. The rear first plate portion 3104 is positioned above the upper end of the guide portion 460 in the up-down direction. The rear first plate portion 3104 is positioned rearward of the accommodating portion 220 in the front-rear direction. As shown in FIG. 17, in the pitch direction, a position of the rear first plate portion 3104 overlaps with the position of the accommodating portion 220.

As shown in FIG. 17, the first shell contact portions 312 include two front first shell contact portions 3122 and two rear first shell contact portions 3124.

As shown in FIG. 17, each of the front first shell contact portions 3122 is provided on the front first plate portion 3102. Referring to FIG. 12, each of the front first shell contact portions 3122 has a resilient property. Each of the front first shell contact portions 3122 is resiliently deformable in the up-down direction. Each of the front first shell contact portions 3122 protrudes upward in the up-down direction.

As shown in FIG. 17, each of the rear first shell contact portions 3124 is provided on the rear first plate portion 3104. Referring to FIG. 13, each of the rear first shell contact portions 3124 has a resilient property. Each of the rear first shell contact portions 3124 is resiliently deformable in the up-down direction. Each of the rear first shell contact portions 3124 protrudes upward in the up-down direction.

As shown in FIG. 17, the fixed shell 300 further has additional first plate portions 320.

Referring to FIG. 15, each of the additional first plate portions 320 of the present embodiment has a flat-plate shape perpendicular to the up-down direction. The number of the additional first plate portions 320 of the present embodiment is two. However, the present invention is not limited thereto, but the number of the additional first plate portion 320 may be one. The additional first plate portions 320 are arranged in the pitch direction. The accommodating portion 220 is positioned between the two additional first plate portions 320 in the pitch direction. As shown in FIG. 8, the two additional first plate portions 320 are positioned at position same as each other in the up-down direction. The first plate portions 310 and the additional first plate portions 320 are positioned at positions same as each other in up-down direction. Referring to FIGS. 8 and 14, each of the additional first plate portions 320 is positioned above the fixed housing 200 in the up-down direction. Referring to FIGS. 11 and 14, each of the additional first plate portions 320 is positioned above the movable housing 500 in the up-down direction. Each of the additional first plate portions 320 is positioned above any of the terminals 400 in the up-down direction. Each of the additional first plate portions 320 is positioned above the upper end of the guide portion 460 in the up-down direction. As shown in FIG. 17, each of the additional first plate portions 320 is positioned outside the accommodating portion 220 in the horizontal plane perpendicular to the up-down direction. Each of the additional first plate portions 320 is positioned outside the accommodating portion 220 in the pitch direction. In the front-rear direction, a position of each of the additional first plate portions 320 overlaps with the position of the accommodating portion 220. Referring to FIGS. 17 and 18, the additional first plate portions 320 correspond to the regulating portions 210, respectively. Each of the additional first plate portions 320 is positioned above the regulating portion 210 corresponding thereto in the up-down direction. Referring to FIGS. 14 and 15, the additional first plate portions 320 correspond to the regulated portions 510, respectively. Each of the additional first plate portions 320 is positioned above the regulated portion 510 corresponding thereto in the up-down direction.

As shown in FIG. 17, the additional first plate portions 320 include a right first plate portion 3202 and a left first plate portion 3204.

As shown in FIG. 8, the right first plate portion 3202 of the present embodiment is positioned at a position same as a position of the left first plate portion 3204 in the up-down direction. As shown in FIG. 17, the right first plate portion 3202 defines a right end of the fixed shell 300 in the right-left direction. The right first plate portion 3202 is positioned rightward of the accommodating portion 220 in the right-left direction. In the front-rear direction, a position of the right first plate portion 3202 overlaps with the position of the accommodating portion 220. The right first plate portion 3202 and the left first plate portion 3204 are positioned at positions same as each other in the front-rear direction. As shown in FIG. 9, the right first plate portion 3202 couples the front plate portion 330 and the rear plate portion 340 with each other. As shown in FIG. 14, the right first plate portion 3202 is positioned above the fixed housing 200 in the up-down direction. Referring to FIGS. 11 and 14, the right first plate portion 3202 is positioned above the movable housing 500 in the up-down direction. The right first plate portion 3202 is positioned above any of the terminals 400 in the up-down direction. The right first plate portion 3202 is positioned above the upper end of the guide portion 460 in the up-down direction.

As shown in FIG. 17, the left first plate portion 3204 defines a left end of the fixed shell 300 in the right-left direction. The left first plate portion 3204 is positioned leftward of the accommodating portion 220 in the right-left direction. In the front-rear direction, a position of the left first plate portion 3204 overlaps with the position of the accommodating portion 220. Referring FIGS. 6 and 15, the left first plate portion 3204 couples the front plate portion 330 and the rear plate portion 340 with each other. As shown in FIG. 15, the left first plate portion 3204 is positioned above the fixed housing 200 in the up-down direction. Referring to FIGS. 11 and 15, the left first plate portion 3204 is positioned above the movable housing 500 in the up-down direction. The left first plate portion 3204 is positioned above any of the terminals 400 in the up-down direction. The left first plate portion 3204 is positioned above the upper end of the guide portion 460 in the up-down direction.

Referring to FIG. 15, the movable shell 600 of the present embodiment is made of metal. As shown in FIG. 11, the movable shell 600 is attached to the movable housing 500. The movable shell 600 covers, at least in part, the movable housing 500 in the horizontal plane. The movable shell 600 covers the protruding portion 520 in the horizontal plane.

As shown in FIG. 15, the movable shell 600 has a surrounding plate portion 630, press-fit portions 650 and a plurality of second plate portions 610.

As shown in FIG. 6, the surrounding plate portion 630 is positioned outside the protruding portion 520 in the horizontal plane. The surrounding plate portion 630 surrounds the protruding portion 520 in the horizontal plane. As shown in FIG. 11, the surrounding plate portion 630 is positioned in the accommodating portion 220. The surrounding plate portion 630 defines an outer edge of the mating connector receiving portion 150 in the horizontal plane.

Figure 7:
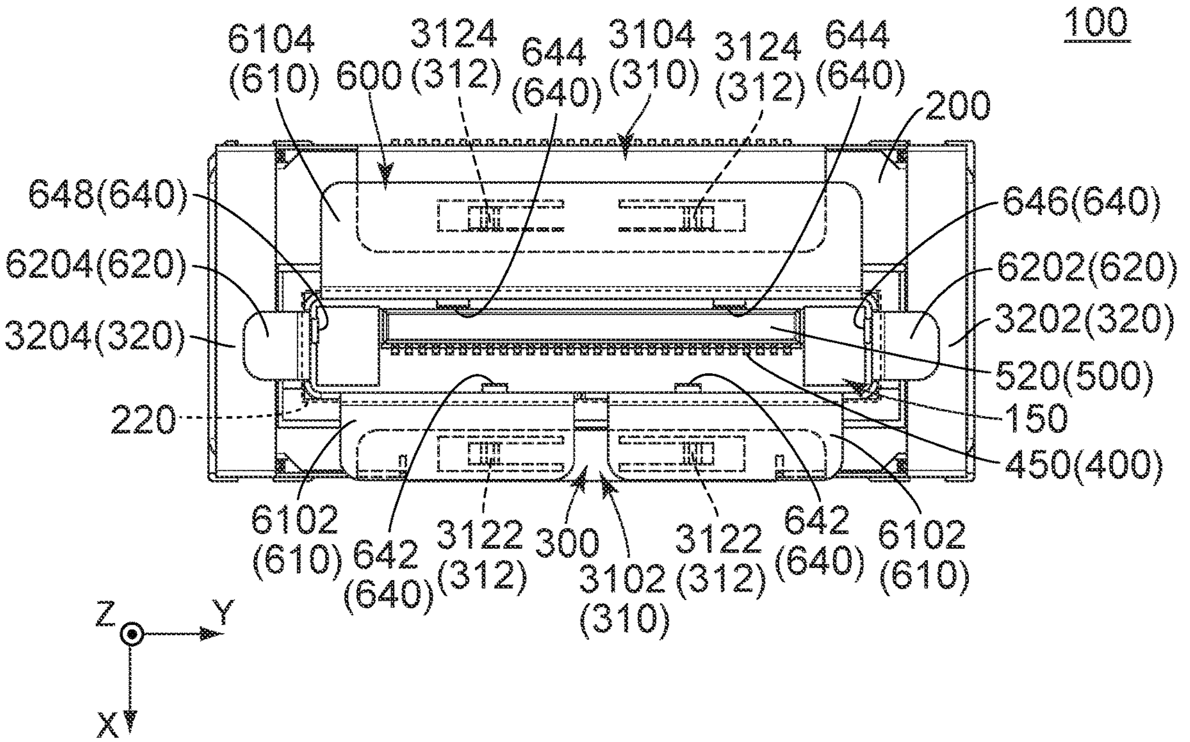
FIG. 7 is a top view showing the floating connector of FIG. 5. In the figure, first plate portions and first shell contact portions are depicted by dotted lines.

As shown in FIGS. 7 and 15, the surrounding plate portion 630 is provided with a plurality of contact portions 640. The number of the contact portions 640 of the present embodiment is six. Each of the contact portions 640 has a resilient property. Each of the contact portions 640 is resiliently deformable in a direction perpendicular to the up-down direction. As shown in FIG. 7, each of the contact portions 640 protrudes in the mating connector receiving portion 150. Referring to FIGS. 4 and 11, each of the contact portions 640 is brought into contact with the mating shell 720 when the floating connector 100 and the mating connector 700 are mated with each other.

As shown in FIGS. 15 and 16, the surrounding plate portion 630 of the present embodiment has a front portion 632, a rear portion 634, a right portion 636 and a left portion 638.

As shown in FIG. 11, the front portion 632 of the present embodiment extends in the up-down direction. The front portion 632 defines a front end of the surrounding plate portion 630 in the front-rear direction. The front portion 632 is positioned forward of the protruding portion 520 in the front-rear direction. Referring to FIGS. 11 to 13, the front portion 632 is positioned between the two first plate portions 310 in the front-rear direction. The front portion 632 is positioned rearward of the front first plate portion 3102 in the front-rear direction. The front portion 632 is positioned forward of the rear first plate portion 3104 in the front-rear direction. Referring to FIGS. 15 and 16, the front portion 632 couples the right portion 636 and the left portion 638 with each other in the right-left direction.

As shown in FIG. 11, the rear portion 634 of the present portion extends in the up-down direction. The rear portion 634 defines a rear end of the surrounding plate portion 630 in the front-rear direction. The rear portion 634 is positioned rearward of the protruding portion 520 in the front-rear direction. Referring to FIGS. 11 to 13, the rear portion 634 is positioned between the two first plate portions 310 in the front-rear direction. The rear portion 634 is positioned rearward of the front first plate portion 3102 in the front-rear direction. The rear portion 634 is positioned forward of the rear first plate portion 3104 in the front-rear direction. The protruding portion 520 is positioned between the front portion 632 and the rear portion 634 in the front-rear direction. Referring to FIGS. 15 and 16, the rear portion 634 couples the right portion 636 and the left portion 638 with each other in the right-left direction.

As shown in FIG. 16, the right portion 636 of the present embodiment extends in the up-down direction. The right portion 636 defines a right end of the surrounding plate portion 630 in the right-left direction. The right portion 636 couples the front portion 632 and the rear portion 634 with each other in the front-rear direction. The right portion 636 and the left portion 638 are positioned at positions same as each other in the front-rear direction.

As shown in FIG. 15, the left portion 638 of the present embodiment extends in the up-down direction. The left portion 638 defines a left end of the surrounding plate portion 630 in the right-left direction. The left portion 638 couples the front portion 632 and the rear portion 634 with each other in the front-rear direction.

As shown in FIG. 7, the contact portions 640 include two front contact portions 642, two rear contact portions 644, a right contact portion 646 and a left contact portion 648.

As shown in FIG. 15, each of the front contact portions 642 is provided on the front portion 632. Each of the front contact portions 642 has a resilient property. Referring to FIG. 11, each of the front contact portions 642 is resiliently deformable in the front-rear direction. Each of the front contact portions 642 protrudes rearward in the front-rear direction. Referring to FIGS. 4 and 11, each of the front contact portions 642 is brought into contact with the mating shell 720 from its front when the floating connector 100 and the mating connector 700 are mated with each other.

Referring to FIG. 11, each of the rear contact portions 644 is provided on the rear portion 634. Each of the rear contact portions 644 has a resilient property. Each of the rear contact portions 644 is resiliently deformable in the front-rear direction. Each of the rear contact portions 644 protrudes forward in the front-rear direction. Referring to FIGS. 4 and 11, each of the rear contact portions 644 is brought into contact with the mating shell 720 from its rear when the floating connector 100 and the mating connector 700 are mated with each other.

Figure 2:
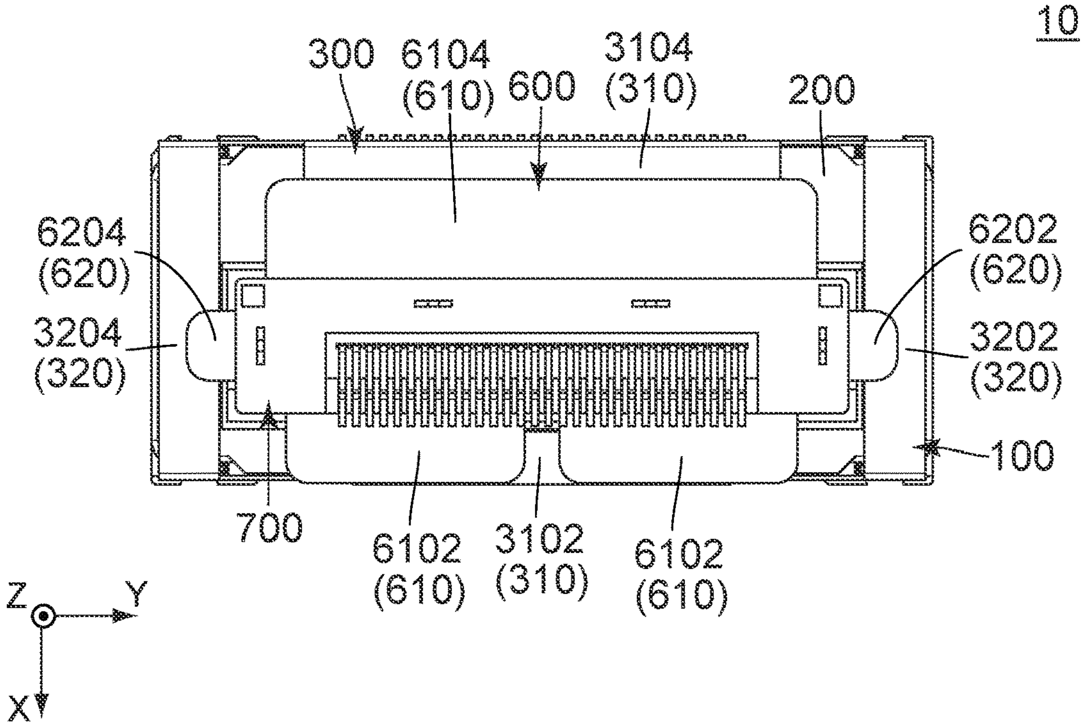
FIG. 2 is a top view showing the assembly of FIG. 1.
Figure 3:
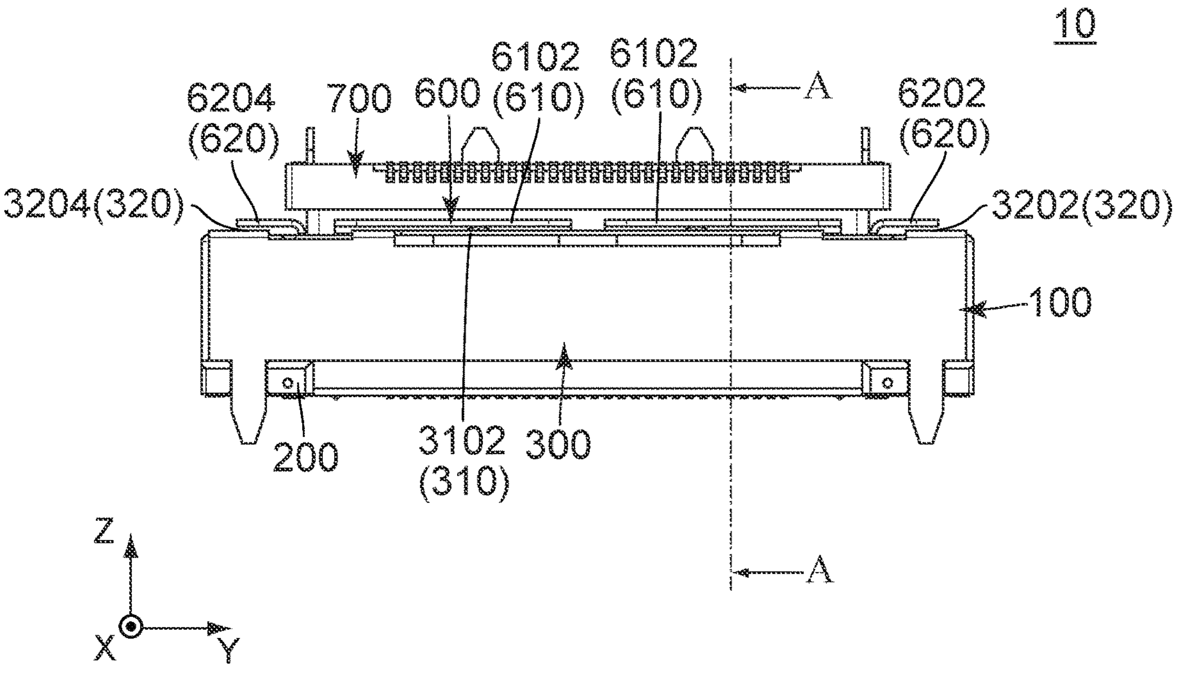
FIG. 3 is a front view showing the assembly of FIG. 1.

Referring to FIGS. 7 and 16, the right contact portion 646 is provided on the right portion 636. The right contact portion 646 has a resilient property. The right contact portion 646 is resiliently deformable in the right-left direction. The right contact portion 646 protrudes leftward in the right-left direction. Referring to FIGS. 2, 7 and 19, the right contact portion 646 is brought into contact with the mating shell 720 from its right when the floating connector 100 and the mating connector 700 are mated with each other.

Referring to FIGS. 7 and 15, the left contact portion 648 is provided on the left portion 638. The left contact portion 648 has a resilient property. The left contact portion 648 is resiliently deformable in the right-left direction. The left contact portion 648 protrudes rightward in the right-left direction. Referring to FIGS. 2, 7 and 19, the left contact portion 648 is brought into contact with the mating shell 720 from its left when the floating connector 100 and the mating connector 700 are mated with each other.

As shown in FIG. 15, each of the press-fit portions 650 of the present embodiment protrudes downward from a lower end of the surrounding plate portion 630. Each of the press-fit portions 650 is press-fit into the base portion 505. Accordingly, the movable shell 600 is held by the movable housing 500. It is noted that a method of holding the movable shell 600 to the movable housing 500 is not limited to the method described above.

As shown in FIG. 7, the number of the second plate portions 610 of the present embodiment is three. However, the present invention is not limited thereto, but the number of the second plate portion 610 may be one. Each of the second plate portions 610 is positioned outside the accommodating portion 220 in the horizontal plane perpendicular to the up-down direction. Each of the second plate portions 610 is positioned outside the accommodating portion 220 in the front-rear direction. In the pitch direction, a position of each of the second plate portions 610 overlaps with the position of the accommodating portion 220. Referring to FIGS. 7 and 18, each of the second plate portions 610 is positioned between the two regulating portions 210 in the pitch direction. Referring to FIGS. 7 and 15, each of the second plate portions 610 is positioned between the two regulated portions 510 in the pitch direction. As shown in FIG. 11, each of the second plate portions 610 has a flat-plate shape perpendicular to the up-down direction. The three second plate portions 610 are positioned at positions same as each other in the up-down direction. Each of the second plate portions 610 is positioned above the fixed housing 200 in the up-down direction. Each of the second plate portions 610 is positioned above the movable housing 500 in the up-down direction. Each of the second plate portions 610 is positioned above any of the terminals 400 in the up-down direction. Each of the second plate portions 610 is positioned above the contact point 450 in the up-down direction. More specifically, each of the second plate portions 610 is positioned above the upper end of the guide portion 460 in the up-down direction. The second plate portion 610 faces the first plate portion 310 in the up-down direction. Each of the second plate portions 610 is positioned above any of the first plate portions 310 in the up-down direction. Each of the second plate portions 610 is positioned above the surrounding plate portion 630 in the up-down direction.

As shown in FIG. 11, each of the second plate portions 610 is provided with second shell contact portion(s) 612. More specifically, the movable shell 600 is provided with four of the second shell contact portions 612. However, the present invention is not limited thereto, but the movable shell 600 should be provided with one of the second shell contact portion 612. Each of the second shell contact portions 612 faces downward in the up-down direction. Each of the second shell contact portions 612 is a plane perpendicular to the up-down direction. The second shell contact portion 612 is positioned above the first shell contact portion 312 in the up-down direction. More specifically, the second shell contact portions 612 correspond to the first shell contact portions 312, respectively, and each of the second shell contact portions 612 is positioned above the first shell contact portion 312 corresponding thereto in the up-down direction.

Referring to FIGS. 10, 11 and 18, the first shell contact portion 312 and the second shell contact portion 612 corresponding thereto are always in contact with each other within the movable range MA of the movable housing 500.

As described above, the second shell contact portion 612, which is in contact with the first shell contact portion 312 corresponding thereto in the up-down direction, is provided on the second plate portion 610 which has the flat-plate shape perpendicular to the up-down direction. Accordingly, the floating connector 100 of the present embodiment is configured so that the first shell contact portion 312 and the second shell contact portion 612 corresponding thereto can be in contact with each other while the movable housing 500 is movable within the movable range MA in the horizontal plane.

As described above, each of the first plate portions 310, which are provided with the first shell contact portions 312, is positioned above any of the terminals 400, and each of the second plate portions 610, which are provided with the second shell contact portions 612, is positioned above any of the terminals 400. In other words, the floating connector 100 of the present embodiment is configured so that the first shell contact portion 312 and the second shell contact portion 612 corresponding thereto are in contact with each other at a space above any of the terminals 400. Accordingly, the floating connector 100 can have a reduced height while the resilient deformation of each of the terminals 400 is not prevented.

Referring to FIGS. 11 to 14, each of the regulating portions 210 regulates a movement of the second shell contact portion 612 away from the first shell contact portion 312 corresponding thereto in the up-down direction. Specifically, each of the regulating portions 210 regulates a movement of the movable housing 500 in the up-down direction and thereby regulates the movement of the second shell contact portion 612. More specifically, when the movable housing 500 is intended to be moved upward in the up-down direction, each of the regulated portions 510 of the movable housing 500 abuts against the regulating portion 210 corresponding thereto from below and thereby an upward movement of the movable housing 500 is regulated. As described above, the movable shell 600 is attached to the movable housing 500. Accordingly, when the upward movement of the movable housing 500 is regulated, an upward movement of each of the second shell contact portions 612 of the movable shell 600 is also regulated. This prevents breaking of the contact of the first shell contact portion 312 and the second shell contact portion 612 corresponding thereto due to the upward movement of the second shell contact portion 612 when the movable housing 500 is moved within the movable range MA.

As shown in FIG. 7, the second plate portions 610 include two front second plate portions 6102 and a rear second plate portion 6104.

Figure 5:
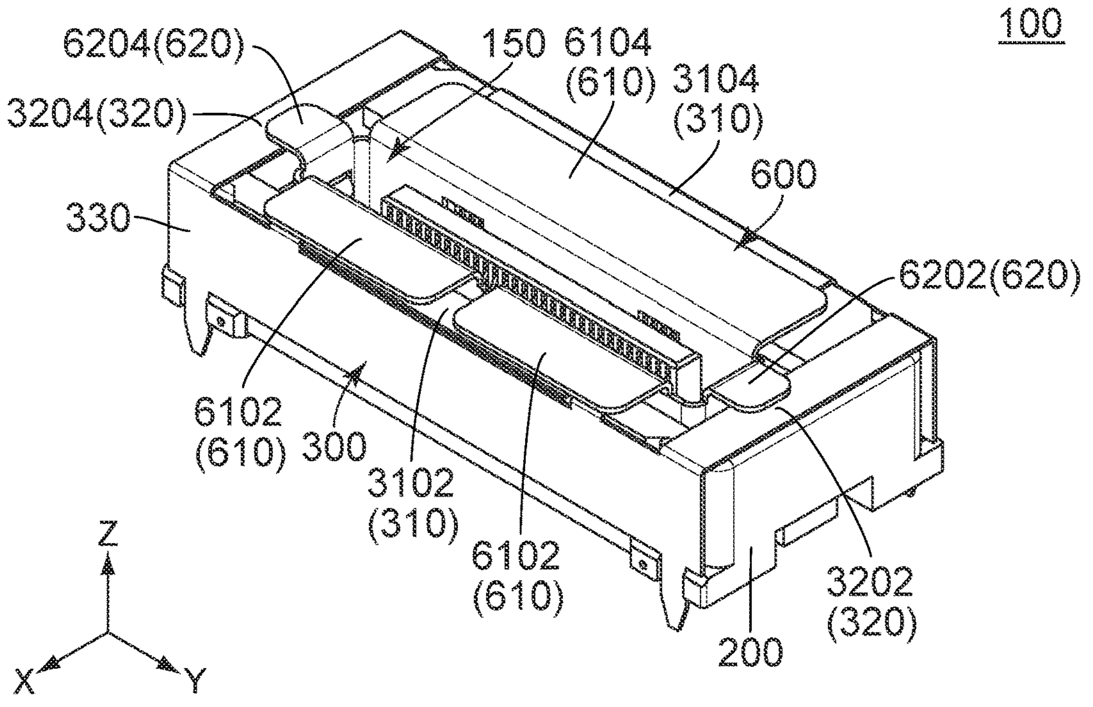
FIG. 5 is a perspective view showing a floating connector which is included in the assembly of FIG. 1.

As shown in FIGS. 11 and 12, each of the front second plate portions 6102 of the present embodiment extends forward in the front-rear direction from the front portion 632. Each of the front second plate portions 6102 is positioned above the fixed housing 200 in the up-down direction. Each of the front second plate portions 6102 is positioned above the movable housing 500 in the up-down direction. Each of the front second plate portions 6102 is positioned above any of the terminals 400 in the up-down direction. Each of the front second plate portions 6102 is positioned above the upper end of the guide portion 460 in the up-down direction. As shown in FIG. 12, each of the front second plate portions 6102 is positioned above the front first plate portion 3102 in the up-down direction. Each of the front second plate portions 6102 faces the front first plate portion 3102 in the up-down direction. Referring to FIGS. 5 and 8, the two front second plate portions 6102 are positioned at positions same as each other in the up-down direction. As shown in FIG. 7, the two front second plate portions 6102 are arranged in the pitch direction with a gap left therebetween. However, the present invention is not limited thereto, but the movable shell 600 may be configured so that the two front second plate portions 6102 are coupled with each other in the pitch direction to form a single member. The two front second plate portions 6102 are positioned at positions same as each other in the front-rear direction. Each of the front second plate portions 6102 is positioned forward of the accommodating portion 220 in the front-rear direction. Each of the front second plate portions 6102 is positioned forward of the mating connector receiving portion 150 in the front-rear direction. In the pitch direction, a position of each of the front second plate portions 6102 overlaps with the position of the accommodating portion 220.

As shown in FIGS. 11 and 13, the rear second plate portion 6104 of the present embodiment extends rearward in the front-rear direction from the rear portion 634. The rear second plate portion 6104 is positioned above the fixed housing 200 in the up-down direction. The rear second plate portion 6104 is positioned above the movable housing 500 in the up-down direction. The rear second plate portion 6104 is positioned above any of the terminals 400 in the up-down direction. The rear second plate portion 6104 is positioned above the upper end of the guide portion 460 in the up-down direction. As shown in FIG. 13, the rear second plate portion 6104 is positioned above the rear first plate portion 3104 in the up-down direction. The rear second plate portion 6104 faces the rear first plate portion 3104 in the up-down direction. As shown in FIG. 7, the rear second plate portion 6104 is positioned rearward of the accommodating portion 220 in the front-rear direction. The rear second plate portion 6104 is positioned rearward of the mating connector receiving portion 150 in the front-rear direction. In the pitch direction, a position of the rear second plate portion 6104 overlaps with the position of the accommodating portion 220.

Referring to FIGS. 8 and 16, the second shell contact portions 612 include two front second shell contact portions 6122 and two rear second shell contact portions 6124.

Referring to FIG. 8, the front second shell contact portions 6122 are provided on the front second plate portions 6102, respectively. Referring to FIGS. 7 and 8, the front second shell contact portions 6122 correspond to the front first shell contact portions 3122, respectively. Referring to FIGS. 7, 12 and 18, the front first shell contact portion 3122 and the front second shell contact portion 6122 corresponding thereto are always in contact with each other within the movable range MA of the movable housing 500.

As shown in FIG. 16, each of the rear second shell contact portions 6124 is provided on the rear second plate portion 6104. Referring to FIGS. 7 and 16, the rear second shell contact portions 6124 correspond to the rear first shell contact portions 3124, respectively. Referring to FIGS. 7, 13 and 18, the rear first shell contact portions 3124 and the rear second shell contact portion 6124 corresponding thereto are always in contact with each other within the movable range MA of the movable housing 500.

As shown in FIG. 15, the movable shell 600 further has additional second plate portions 620.

As shown in FIG. 15, each of the additional second plate portions 620 of the present embodiment has a flat-plate shape perpendicular to the up-down direction. In the present embodiment, the number of the additional second plate portions 620 is two. However, the present invention is not limited thereto, but the number of the additional second plate portion 620 may be one. As shown in FIG. 7, the additional second plate portions 620 are arranged in the pitch direction. Each of the additional second plate portions 620 is positioned outside the accommodating portion 220 in the horizontal plane perpendicular to the up-down direction. Each of the additional second plate portions 620 is positioned outside the accommodating portion 220 in the pitch direction. In the front-rear direction, a position of each of the additional second plate portions 620 overlaps with the position of the accommodating portion 220. The accommodating portion 220 is positioned between the two additional second plate portions 620 in the pitch direction. As shown in FIG. 8, the two additional second plate portions 620 are positioned at positions same as each other in the up-down direction. The second plate portions 610 and the additional second plate portions 620 are positioned at positions same as each other in the up-down direction. Referring to FIG. 14, each of the additional second plate portions 620 is positioned above the fixed housing 200 in the up-down direction. Referring to FIGS. 11 and 14, each of the additional second plate portions 620 is positioned above the movable housing 500 in the up-down direction. Each of the additional second plate portions 620 is positioned above any of the terminals 400 in the up-down direction. Each of the additional second plate portions 620 is positioned above any of the upper end of the guide portion 460 in the up-down direction. Referring to FIG. 16, the additional second plate portions 620 correspond to the regulating portions 210, respectively. Referring to FIGS. 14 and 16, each of the additional second plate portions 620 is positioned above the regulating portion 210 corresponding thereto in the up-down direction. Referring to FIGS. 14 and 15, the additional second plate portions 620 correspond to the regulated portions 510, respectively. Each of the additional second plate portions 620 is positioned above the regulated portion 510 corresponding thereto in the up-down direction.

As shown in FIG. 14, the additional second plate portion 620 is positioned above the additional first plate portion 320 in the up-down direction. The additional second plate portion 620 faces the additional first plate portion 320 in the up-down direction. As shown in FIG. 7, the additional second plate portions 620 correspond to the additional first plate portions 320, respectively. Each of the additional second plate portions 620 is positioned above the additional first plate portion 320 corresponding thereto in the up-down direction. Each of the additional second plate portions 620 faces the additional first plate portion 320 corresponding thereto in the up-down direction. However, the present invention is not limited thereto. Specifically, the floating connector 100 may be configured as follows: the additional second plate portion 620 is provided with an additional second shell contact portion; the additional first plate portion 320 corresponding thereto is provided with an additional first shell contact portion; and the additional second shell contact portion and the additional first shell contact portion are in contact with each other in the up-down direction. Referring to FIGS. 7 and 18, the additional second plate portion 620 and the additional first plate portion 320 corresponding thereto guide a movement of the movable shell 600 when the movable housing 500 is moved within the movable range MA in the horizontal plane. As described above, the movable shell 600 is attached to the movable housing 500. Thus, the additional second plate portion 620 and the additional first plate portion 320 corresponding thereto also guide the movement of the movable housing 500 via the movable shell 600 when the movable housing 500 is moved within the movable range MA in the horizontal plane.

As shown in FIG. 7, the additional second plate portions 620 include a right second plate portion 6202 and a left second plate portion 6204.

As shown in FIG. 7, the right second plate portions 6202 of the present embodiment defines a right end of the movable shell 600 in the right-left direction. The right second plate portion 6202 is positioned rightward of the accommodating portion 220 in the right-left direction. The right second plate portion 6202 is positioned rightward of the mating connector receiving portion 150 in the right-left direction. In the front-rear direction, a position of the right second plate portion 6202 overlaps with the position of the accommodating portion 220. The right second plate portion 6202 and the left second plate portion 6204 are positioned at positions same as each other in the front-rear direction. As shown in FIG. 8, the right second plate portion 6202 and the left second plate portion 6204 are positioned at positions same as each other in the up-down direction. As shown in FIG. 14, the right second plate portion 6202 is positioned above the fixed housing 200 in the up-down direction. The right second plate portion 6202 is positioned above the right first plate portion 3202 in the up-down direction. The right second plate portion 6202 faces the right first plate portion 3202 in the up-down direction. Referring to FIGS. 11 and 14, the right second plate portion 6202 is positioned above the movable housing 500 in the up-down direction. The right second plate portion 6202 is positioned above any of the terminals 400 in the up-down direction. The right second plate portion 6202 is positioned above the upper end of the guide portion 460 in the up-down direction.

As shown in FIG. 7, the left second plate portions 6204 of the present embodiment defines a left end of the movable shell 600 in the right-left direction. The left second plate portion 6204 is positioned leftward of the accommodating portion 220 in the right-left direction. The left second plate portion 6204 is positioned leftward of the mating connector receiving portion 150 in the right-left direction. In the front-rear direction, a position of the left second plate portion 6204 overlaps with the position of the accommodating portion 220. Referring to FIGS. 7 and 11, the left second plate portion 6204 is positioned above the fixed housing 200 in the up-down direction. The left second plate portion 6204 is positioned above the movable housing 500 in the up-down direction. The left second plate portion 6204 is positioned above any of the terminals 400 in the up-down direction. The left second plate portion 6204 is positioned above the upper end of the guide portion 460 in the up-down direction. As shown in FIG. 8, the left second plate portion 6204 is positioned above the left first plate portion 3204 in the up-down direction. The left second plate portion 6204 faces the left first plate portion 3204 in the up-down direction.

Although the specific explanation about the present invention is made above referring to the embodiments, the present invention is not limited thereto and is susceptible to various modifications and alternative forms. In addition, the above embodiments and variations may also be combined.

Although the floating connector 100 of the aforementioned embodiment is configured so that the second shell contact portion 612 is the plane while the first shell contact portion 312 has the resilient property, the present invention is not limited thereto. Specifically, the floating connector 100 may be configured so that the first shell contact portion 312 is a plane while the second shell contact portion 612 has a resilient property. In other words, at least one of the first shell contact portion 312 and the second shell contact portion 612 should have a resilient property. In this case, the first shell contact portion 312 and the second shell contact portion 612 are in contact with each other in the up-down direction by the resilient property of the at least one of the first shell contact portion 312 and the second shell contact portion 612.

Although the floating connector 100 of the aforementioned embodiment is configured so that the second shell contact portion 612 is positioned above the first shell contact portion 312 corresponding thereto in the up-down direction while the regulating portion 210 regulates the upward movement of the movable housing 500 in the up-down direction and thereby regulates the upward movement of the second shell contact portion 612, the present invention is not limited thereto. Specifically, the floating connector 100 may be configured so that the second shell contact portion 612 is positioned below the first shell contact portion 312 in the up-down direction while the regulating portion 210 regulates a downward movement of the movable housing 500 in the up-down direction and thereby regulates a downward movement of the second shell contact portion 612. A floating connector 100 with this configuration can also achieve the same effect as the floating connector 100 of the present embodiment.

Although the regulating portion 210 of the aforementioned embodiment regulates the upward movement of the second shell contact portion 612 of the movable shell 600, which is attached to the movable housing 500, by regulating the upward movement of the movable housing 500, the present invention is not limited thereto. Specifically, the floating connector 100 may be configured so that the regulating portion 210 regulates the upward movement of the second shell contact portion 612 by directly regulating an upward movement of the movable shell 600

Although each of the regulating portions 210 of the present embodiment is the part of the fixed housing 200, the present invention is not limited thereto. Specifically, the regulating portion 210 may be a part of the fixed shell 300. In this case, the regulating portion 210 should regulate a movement of the second shell contact portion 612 away from the first shell contact portion 312 in the up-down direction.

Although the floating connector 100 of the aforementioned embodiment is configured so that the regulating portions 210 are positioned at the opposite ends, respectively, of the fixed housing 200 in the pitch direction while the regulated portions 510 are positioned at the opposite ends, respectively, of the base portion 505 in the pitch direction, the present invention is not limited thereto. Provided that the upward movement of the movable housing 500 is regulated, the regulating portion 210 may be arranged at any location of the fixed housing 200, and the regulated portion 510 may be arranged at any location of the base portion 505.

Although each of the second plate portions 610 of the aforementioned embodiment is positioned above any of the contact point 450 and the surrounding plate portion 630, the present invention is not limited thereto. Specifically, each of the surrounding plate portion 630 and the contact point 450 may be arranged above the second plate portion 610 if the assembly 10 is required to have an increased distance between the circuit board, on which the floating connector 100 is mounted, and the circuit board on which the mating connector 700 is mounted.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A floating connector mountable on a circuit board and mateable with a mating connector in an up-down direction, wherein:

the floating connector comprises a fixed housing, a fixed shell, a terminal, a movable housing, a movable shell and a regulating portion;

the fixed shell is fixed to the circuit board when the floating connector is mounted on the circuit board;

the fixed shell is attached to the fixed housing;

the fixed shell covers, at least in part, the fixed housing in a horizontal plane perpendicular to the up-down direction;

the fixed shell is provided with a first shell contact portion;

the terminal has a first held portion, a second held portion, a coupling portion, a supporting portion and a contact point;

the first held portion is held by the fixed housing;

the second held portion is held by the movable housing;

the coupling portion is resiliently deformable;

the coupling portion couples the first held portion and the second held portion with each other;

the supporting portion extends from the second held portion;

the supporting portion supports the contact point;

the movable housing is movable at least in the horizontal plane relative to the fixed housing by resilient deformation of the coupling portion;

the movable shell is attached to the movable housing;

the movable shell covers, at least in part, the movable housing in the horizontal plane;

the movable shell is provided with a second shell contact portion;

at least one of the first shell contact portion and the second shell contact portion has a resilient property;

the first shell contact portion and the second shell contact portion are in contact with each other in the up-down direction by the resilient property of the at least one of the first shell contact portion and the second shell contact portion; and the regulating portion regulates a movement of the second shell contact portion away from the first shell contact portion in the up-down direction.

2. The floating connector as recited in claim 1, wherein the first shell contact portion and the second shell contact portion are always in contact with each other within a movable range of the movable housing.

3. The floating connector as recited in claim 1, wherein the regulating portion is a part of the fixed housing.

4. The floating connector as recited in claim 1, wherein the regulating portion regulates a movement of the movable housing in the up-down direction and thereby regulates the movement of the second shell contact portion.

5. The floating connector as recited in claim 1, wherein:

the fixed shell has a first plate portion;

the first shell contact portion is provided on the first plate portion;

the movable shell has a second plate portion;

the second plate portion faces the first plate portion in the up-down direction; and the second shell contact portion is provided on the second plate portion.

6. The floating connector as recited in claim 5, wherein:

the first plate portion is positioned above the terminal in the up-down direction; and the second plate portion is positioned above the first plate portion in the up-down direction.

7. The floating connector as recited in claim 6, wherein:

the fixed housing has an accommodating portion;

the accommodating portion accommodates, at least in part, any of the movable housing and the movable shell;

the fixed shell further has an additional first plate portion;

each of the first plate portion and the additional first plate portion is positioned outward of the accommodating portion in the horizontal plane;

the movable shell further has an additional second plate portion;

each of the second plate portion and the additional second plate portion is positioned outward of the accommodating portion in the horizontal plane; and in the up-down direction, the additional second plate portion is positioned above the additional first plate portion and faces the additional first plate portion.

* * * * *